United States Patent
Teyeb et al.

(10) Patent No.: US 12,231,968 B2
(45) Date of Patent: *Feb. 18, 2025

(54) METHODS AND APPARATUSES FOR HANDLING THE CONFIGURATION OF MEASUREMENTS TO BE PERFORMED BY A USER EQUIPMENT IN A WIRELESS COMMUNICATION NETWORK

(71) Applicant: Telefonaktiebolaget LM Ericsson (publ), Stockholm (SE)

(72) Inventors: Oumer Teyeb, Montréal (CA); Mårten Ericson, Gammelstad (SE); Pradeepa Ramachandra, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 180 days.

This patent is subject to a terminal disclaimer.

(21) Appl. No.: 17/945,643

(22) Filed: Sep. 15, 2022

(65) Prior Publication Data
US 2023/0013696 A1 Jan. 19, 2023

Related U.S. Application Data

(63) Continuation of application No. 17/887,823, filed on Aug. 15, 2022, now Pat. No. 11,832,138, which is a
(Continued)

(51) Int. Cl.
*H04W 36/00* (2009.01)
*H04W 36/24* (2009.01)

(52) U.S. Cl.
CPC . *H04W 36/0058* (2018.08); *H04W 36/00698* (2023.05); *H04W 36/0094* (2013.01); *H04W 36/249* (2023.05)

(58) Field of Classification Search
CPC ............. H04W 24/10; H04W 36/0058; H04W 36/0055; H04W 36/0066; H04W 36/0069;
(Continued)

(56) References Cited

U.S. PATENT DOCUMENTS

| | | |
|---|---|---|
| 9,619,608 B1 | 4/2017 | Bernard et al. |
| 9,867,093 B2 | 1/2018 | Wang et al. |

(Continued)

FOREIGN PATENT DOCUMENTS

| | | |
|---|---|---|
| CN | 103314613 A | 9/2013 |
| CN | 105992292 A | 10/2016 |

(Continued)

OTHER PUBLICATIONS

Shine E J (KR 2018063864 A) >>> System For Assigning Measurement Gap Of Position Reference Signal Of Internet Of Things (IoT) Base Station, Has Service Cell That Is Configured For Transmitting Control Message Including Gap Offset Information To Terminal (see title) (Year: 2018).*

(Continued)

*Primary Examiner* — Meless N Zewdu
(74) *Attorney, Agent, or Firm* — Murphy, Bilak & Homiller, PLLC

(57) ABSTRACT

A method performed by a first base station, is described. The first base station determines a change in one or more measurements to be performed by a UE. The measurements are associated with a first set of frequencies. The first base station also transmits a first message to a second base station comprising information regarding which frequencies in the first set are to be changed. The first base station and the second base station serve the UE. A method performed by the second base station is also described whereby the second base station receives the first message. In a method performed by the UE, the UE receives, from the first base
(Continued)

station, a configuration message configured to specify the measurements to perform and a measurement gap configuration. The UE then takes the measurements based on the configuration message.

13 Claims, 14 Drawing Sheets

Related U.S. Application Data continuation of application No. 16/951,307, filed on Nov. 18, 2020, now abandoned, which is a continuation of application No. 16/328,578, filed as application No. PCT/SE2019/050001 on Jan. 3, 2019, now Pat. No. 10,887,802.

(60) Provisional application No. 62/616,370, filed on Jan. 11, 2018.

(58) Field of Classification Search
CPC ............ H04W 36/0072; H04W 24/00; H04W 36/005; H04W 36/0085; H04W 72/0406; H04W 72/04; H04W 72/00; H04W 72/0426; H04W 72/044; H04W 72/048; H04W 72/0486; H04W 72/0493; H04W 88/00; H04W 88/02; H04W 88/08; H04W 88/023; H04W 88/10; H04W 72/0453; H04W 48/20; H04W 48/18; H04W 48/02; H04W 48/04; H04W 36/00; H04W 28/00; H04W 28/0236; H04W 28/0883; H04W 28/08; H04W 28/0819; H04W 28/0808; H04W 28/0815; H04W 28/0289; H04W 28/0226; H04W 36/0088; H04W 36/0094; H04W 16/28; H04W 64/00; H04W 28/0242; H04W 4/02; H04W 36/0011; H04W 36/0016; H04W 76/10; H04W 76/27; H04W 76/25; H04W 36/00698; H04W 36/249; H04W 28/0865; H04W 28/086; H04W 36/144

See application file for complete search history.

(56) References Cited

U.S. PATENT DOCUMENTS

| | | | |
|---|---|---|---|
| 10,200,896 B2* | 2/2019 | Choi ................. | H04W 24/08 |
| 10,305,644 B2 | 5/2019 | Hahn et al. | |
| 10,887,802 B2* | 1/2021 | Teyeb et al. ...... | H04W 36/0060 |
| 10,959,104 B2 | 3/2021 | Hapsari et al. | |
| 11,832,138 B2* | 11/2023 | Teyeb et al. ...... | H04W 36/0069 |
| 2010/0296488 A1 | 11/2010 | Kuo | |
| 2010/0330994 A1 | 12/2010 | Matsuo et al. | |
| 2011/0149913 A1 | 6/2011 | Park et al. | |
| 2011/0237202 A1 | 9/2011 | Uemura et al. | |
| 2012/0076041 A1 | 3/2012 | Jung et al. | |
| 2012/0088516 A1 | 4/2012 | Ji et al. | |
| 2012/0106506 A1* | 5/2012 | Taaghol ................ | 370/331 |
| 2012/0178465 A1* | 7/2012 | Lin et al. ............. | 455/450 |
| 2013/0010763 A1 | 1/2013 | Chen et al. | |
| 2013/0336153 A1 | 12/2013 | Liang | |
| 2014/0162656 A1 | 6/2014 | Chai et al. | |
| 2014/0301360 A1 | 10/2014 | Bontu et al. | |
| 2015/0208366 A1* | 7/2015 | Papasakellariou et al. ................. H04W 52/34 | |
| 2015/0327104 A1 | 11/2015 | Yiu et al. | |
| 2015/0341815 A1* | 11/2015 | Kim et al. ............. | H04W 24/10 |
| 2016/0057640 A1* | 2/2016 | Zhao et al. .......... | H04W 24/08 |
| 2016/0219475 A1* | 7/2016 | Kim ..................... | H04W 36/04 |
| 2016/0248533 A1 | 8/2016 | Li et al. | |
| 2016/0255547 A1 | 9/2016 | Wang et al. | |
| 2016/0345195 A1 | 11/2016 | Axmon et al. | |
| 2016/0381588 A1 | 12/2016 | Strobl et al. | |
| 2017/0034757 A1* | 2/2017 | Yang et al. ........... | H04W 36/30 |
| 2017/0048812 A1 | 2/2017 | Da | |
| 2017/0055202 A1 | 2/2017 | Uchiyama et al. | |
| 2017/0086110 A1 | 3/2017 | Wu et al. | |
| 2017/0127397 A1 | 5/2017 | Hahn et al. | |
| 2017/0201961 A1 | 7/2017 | Siomina et al. | |
| 2018/0084448 A1 | 3/2018 | Yang et al. | |
| 2018/0084473 A1* | 3/2018 | Nagaraja et al. ..... | H04W 36/30 |
| 2018/0092085 A1 | 3/2018 | Shaheen et al. | |
| 2018/0324624 A1 | 11/2018 | Gu et al. | |
| 2019/0075585 A1 | 3/2019 | Deogun et al. | |
| 2019/0124533 A1 | 4/2019 | Tenny et al. | |
| 2019/0141742 A1* | 5/2019 | Zhou et al. ......... | H04W 74/085 |
| 2019/0159086 A1 | 5/2019 | Xu et al. | |
| 2019/0166576 A1 | 5/2019 | Kim et al. | |
| 2019/0182000 A1 | 6/2019 | Futaki | |
| 2020/0077288 A1 | 3/2020 | Tsuboi et al. | |
| 2020/0322827 A1 | 10/2020 | Yao et al. | |
| 2020/0389929 A1 | 12/2020 | Harada et al. | |
| 2021/0014713 A1 | 1/2021 | Xu et al. | |

FOREIGN PATENT DOCUMENTS

| | | | |
|---|---|---|---|
| CN | 109246745 A | 1/2019 | |
| CN | 110035443 A | 7/2019 | |
| CN | 108810929 B | 3/2021 | |
| EP | 3188544 A1 | 7/2017 | |
| JP | 2013529444 A | 7/2013 | |
| WO | 2015047051 A1 | 4/2015 | |
| WO | 2015156324 A1 | 10/2015 | |
| WO | WO 2015171253 A1 * | 11/2015 | ............ H04W 88/02 |
| WO | 2015194570 A1 | 12/2015 | |
| WO | 2017166000 A1 | 10/2017 | |

OTHER PUBLICATIONS

Gheorghiu et al. (TW 201707481 A) >>> Measurement Gaps In Carrier Aggregation (see title) (Year: 2017).*
"Measurement coordination for EN-DC", 3GPP TSG-RAN WG2 Meeting #100, R2-1712439, ZTE Corporation, Reno, USA, Nov. 27-Dec. 1, 2017, 5 pages.
"Measurement framework in case of EN-DC", 3GPP TSG-RAN WG2 #98, Tdoc R2-1704419, Ericsson, Hangzhou, China, Apr. 15-19, 2017, 5 pages.
"RRC signaling transport for LTE-NR interworking not involving coordination", 3GPP TSG-RAN WG2 #97, R2-1700917, Ericsson, Athens, Greece, Feb. 13-17, 2017, 8 pages.
"Transmission of Secondary Node RRC message", 3GPP TSG-RAN3 Meeting #95bis, R3-171237, Huawei, Spokane, Washington, Apr. 3-7, 2017, 5 pages.
3GPP, "3rd Generation Partnership Project; Technical Specification Group Radio Access Network NR Radio Resource Control (RRC) protocol specification (Release 15)", 3GPP TS 38.331 V15.0.0, Dec. 2017, 1-188.
3GPP, "3rd Generation Partnership Project; Technical Specification Group Radio Access Network; NR; Requirements for support of radio resource management (Release 15)", 3GPP TS 38.133 V15. 0.0, Dec. 2017, 1-41.
"3GPP TSG-RAN WG2 Meeting #99bis", RAN2 Chairman (Intel), Chairman Notes, Prague, Czech Republic, Oct. 9-13, 2017, pp. 1-131.
"Discussion on the Configuration of Measurement Gap", 3GPP TSG-RAN WG2 Meeting #100, R2-1712602, ZTE Corporation, Sanechips, Reno, USA, Nov. 27-Dec. 1, 2017, pp. 1-12.
"Draft : LS on gaps for SS block measurement in NR", 3GPP RAN WG4 Meeting 84bis, R4-17111940, Dubrovnik, Croatia, Oct. 9-13, 2017, 1-3.
"Measurement gap configuration in EN-DC", 3GPP TSG-RAN WG2 #100, R2-1713426, Reno, USA, Nov. 27-Dec. 1, 2017, 1-2.
"Measurement Gap Configuration in MR-DC", 3GPP TSG-RAN2 Meeting 100, R2-1712242, Oppo, Reno, USA, Nov. 27-Dec. 1, 2017, pp. 1-5.

(56) References Cited

OTHER PUBLICATIONS

"Report of 3GPP TSG RAN2#100 meeting, Reno, Nevada, USA", R2-1801701, final meeting report, ETSI MCC, Athens, Greece, Feb. 26-Mar. 2, 2018, 61 pages.

"Report of 3GPP Tsg RAN2#98 meeting, Hangzhou, China", 3GPP TSG-RAN WG2 meeting #99, R2-1707601, Berlin, Germany, Aug. 21-25, 2017, 1-294.

"Report of e-mail [100#31][NR] Inter-Node RRC message", 3GPP TSG-RAN WG2 NR AH meeting, Tdoc R2-1800845, Vancouver, Canada, Jan. 22-26, 2017, 1-32.

"Summary of Offline Discussin #43 (Gap Type Decision)", 3GPP TSG-RAN WG2 NR #102 Meeting, R2-1809128, ZTE Corporation, Busan, Korea, May 21-25, 2018, pp. 1-9.

"Transmission of SN RRC Messages", 3GPP TSG-RAN2 #98 meeting, HTC, R2-1705128, Hangzhou, China, May 15-19, 2017, pp. 1-4.

"Summary of email discussion [97bis#10][NR] MN/SN measurement coordination", 3GPP TSG-RAN WG2 #98, R2-1704138, NTT Docomo, Inc. (Email discussion rapporteur), Hangzhou, China, May 15-19, 2017, 15 pages.

\* cited by examiner a)

b)

a)

b)

a)

b)

METHODS AND APPARATUSES FOR HANDLING THE CONFIGURATION OF MEASUREMENTS TO BE PERFORMED BY A USER EQUIPMENT IN A WIRELESS COMMUNICATION NETWORK

RELATED APPLICATIONS

This application is a continuation of U.S. application Ser. No. 17/887,823 filed 15 Aug. 2022, which is a continuation of U.S. application Ser. No. 16/951,307 filed 18 Nov. 2020, which is a continuation of U.S. application Ser. No. 16/328,578 filed 26 Feb. 2019 and now issued as U.S. Pat. No. 10,887,802, which is a U.S. National Phase Application of PCT/SE2019/050001 filed 3 Jan. 2019, which claims benefit of U.S. Provisional Application No. 62/616,370 filed 11 Jan. 2018. The entire contents of each aforementioned application is incorporated herein by reference.

TECHNICAL FIELD

The present disclosure relates generally to a first base station and methods performed thereby for handling a change in one RAN2 #99 or more measurements. The present disclosure also relates generally to a second base station and methods performed thereby for handling the change in or more measurements. The present disclosure further relates generally to a user equipment and methods performed thereby for handling the change in or more measurements.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., evolved Node B ("eNB"), "eNodeB", "NodeB", "B node", gNB, Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc., based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

Multi-Carrier Operation

In multicarrier or carrier aggregation (CA) operation, a UE may be able to receive and/or transmit data to more than one serving cell. In other words, a CA capable UE may be configured to operate with more than one serving cell. The carrier of each serving cell may be generally called as a component carrier (CC). In simple words, the component carrier (CC) may be understood to mean an individual carrier in a multi-carrier system. The term carrier aggregation (CA) may be also called, e.g., interchangeably called, "multi-carrier system", "multi-cell operation", "multi-carrier operation", "multi-carrier" transmission and/or reception. This may be understood to mean the CA may be used for transmission of signaling and data in the uplink and downlink directions. One of the CCs is the primary component carrier (PCC), or simply primary carrier, or even anchor carrier. The remaining ones may be called secondary component carrier (SCC), or simply secondary carriers, or even supplementary carriers. The serving cell may be interchangeably called as primary cell (PCell) or primary serving cell (PSC). Similarly, the secondary serving cell may be interchangeably called as secondary cell (SCell) or secondary serving cell (SSC).

Generally, the primary or anchor CC may carry the UE specific signalling that the UE may need. The primary CC, a.k.a. PCC or PCell, may exist in both uplink and downlink directions in CA. In case there is single UL CC, the PCell may be on that CC. The network may assign different primary carriers to different UEs operating in the same sector or cell.

In (DC) operation, the UE may be served by at least two nodes called master eNB (MeNB) and secondary eNB (SeNB). More generally, in multiple connectivity, a.k.a., multi-connectivity, operation, the UE may be served by two or more nodes where each node may operate or manages one cell group, e.g., MeNB, SeNB1, SeNB2 and so on. More specifically, in multi-connectivity, each node may serve or manage at least secondary serving cells belonging its own cell group. Each cell group may contain one or more serving cells. The UE may be configured with PCC from both MeNB and SeNB. The PCell from MeNB and SeNB may be called as PCell and PSCell, respectively. The UE may also be configured with one or more SCCs from each of MeNB and SeNB. The corresponding secondary serving cells served by MeNB and SeNB may be called SCells. The UE in DC may typically have separate Transmitter/Receiver (TX/RX) for each of the connections with MeNB and SeNB. This may allow the MeNB and SeNB to independently configure the UE with one or more procedures e.g., radio link monitoring (RLM), Discontinued Reception (DRX) cycle etc. on their PCell and PSCell respectively.

In multiconnectivity, all cell groups may contain serving cells of the same Radio Access Technology (RAT), e.g., LTE, or different cell groups may contain serving cells of different RATs.

Dual Connectivity in LTE

Evolved Universal Terrestrial Radio Access Network (E-UTRAN) may support Dual Connectivity (DC) operation, whereby a multiple Rx/Tx UE in RRC_CONNECTED may be configured to utilize radio resources provided by two distinct schedulers, located in two eNBs connected via a non-ideal backhaul over the X2 interface (see 3GPP 36.300). DC operation may be understood to advantageously provide data aggregation by using more than one link, as well as link diversity for robustness. eNBs involved in DC for a certain UE may assume two different roles: an eNB may either act as a Master node (MN) or as a Secondary node (SN). In DC, an MN may be understood, for example, as a radio network node which may terminate at least an interface between the radio network node and a Mobility Management Entity (MME). Such an interface may be, for example, an S1 control plane interface between an eNB and an MME (S1-MME). In DC, an SN may be understood as a radio network node that may be providing additional radio resources for a UE but is not the MN. In DC, a UE may be connected to one MN and one SN.

FIG. 1 is a schematic diagram illustrating an exemplary architecture of an LTE DC User Plane (UP), depicting an MN 11, an SN 12 and an X2 interface 13. In LTE DC, the radio protocol architecture that a particular bearer may use may depend on how the bearer may be setup. Three bearer types may exist: Master Cell Group (MCG) bearer 14, Secondary Cell Group (SCG) bearer 15 and split bearers 16. Radio Resource Control (RRC) may be located in the MN and Signaling Radio Bearers (SRBs) may be always configured as a MCG bearer type, and therefore only use the radio resources of the MN. FIG. 1 depicts how each of the MCG bearer 14 and SCG bearer 15 has a respective Packet Data Convergence Protocol (PDCP) entity 17 and Radio Link Control (RLC) entity 18, each connected to a respective Medium Access Control (MAC) 19 entity in each of the MN and SN. The split bearer 16 has a PDCP entity in the MN 11 and is connected to each of the MAC entities 19 in the MN 11 and the SN 12, via, respectively, an RLC entity located in each of the MN 11 and the SN 12.

LTE-NR Dual Connectivity

LTE-New Radio (NR) DC, which may be also referred to as LTE-NR tight interworking, is currently being discussed for Release 15 (rel-15). In this context, the major changes from LTE DC may be understood to be: the introduction of a split bearer from the SN, known as SCG split bearer, the introduction of a split bearer for RRC, and the introduction of a direct RRC from the SN, also referred to as SCG SRB. Split RRC messages may be mainly used for creating diversity, and the sender may decide to either choose one of the links for scheduling the RRC messages, or it may duplicate the message over both links. In the downlink, the path switching between the MCG or SCG legs, or duplication on both, may be left to network implementation. On the other hand, for the UL, the network may configure a UE to use the MCG, SCG or both legs. The terms "leg" and "path" are used interchangeably throughout this document.

The SN may sometimes be referred to as Secondary gNB (SgNB), where gNB is an NR base station, and the MN as Master eNB (MeNB), in case the LTE is the master node and NR is the secondary node. In the other case, where an NR gNB is the master, and an LTE eNB is the secondary node, the corresponding terms may be SeNB and MgNB.

The following terminologies are used throughout this text to differentiate different dual connectivity scenarios:
a) DC refers to LTE DC, that is, where both MN and SN employ LTE;
b) EN-DC refers to LTE-NR dual connectivity, where LTE is the master and NR is the secondary;
c) NE-DC refers to LTE-NR dual connectivity, where NR is the master and LTE is the secondary;
d) NR-DC, or NR-NR DC refers to both MN and SN employ NR, and
e) multi-RAT DC, (MR-DC) is a generic term that may be used to describe where the MN and SN employ different RATs. For example, EN-DC and NE-DC are two different example cases of MR-DC.

FIG. 2 is a schematic diagram illustrating the UP architectures for LTE-NR tight interworking in the MN 21 and the SN 22. An SCG split bearer 23 is present in the SN 22, in addition to the split bearer in the MN 21, which is referred to as an MCG split bearer 24.

FIG. 3 is a schematic diagram illustrating the Control Plane (CP) architecture for LTE-NR tight interworking. An MN 31 operating on LTE, an SN 32 operating on NR, and a UE 33 supporting operation on LTE and NR are illustrated in the Figure, each with its respective protocol stack: RRC 34, PDCP 35, RLC 36, MAC 37 and the Physical layer (PHY) 38. Different signaling radio bearers may be used for carrying RRC messages. SRB0 39, SRB1 40 and SRB2 41, refer to the signaling radio bearers that may be used for carrying RRC messages. An RRC configuration may be sent directly by a configuring node via a direct SRB 42. RRC configurations may be encapsulated in another node's RRC message via Embedded RRC 43.

In E-UTRAN-NR dual connectivity, the master cell group may contain at least one E-UTRA PCell, while the secondary cell group may contain at least one NR PSCell. In this example, the master CG and the secondary CG may be managed by an eNB and a gNB, respectively.

In NR-E-UTRAN dual connectivity, the master cell group may contain at least one NR PCell, while the secondary cell group may contain at least one LTE PSCell. In this example, the master CG and the secondary CG may be managed by a gNB and an eNB, respectively.

Measurement Gaps in LTE

Inter-frequency measurements in LTE may be conducted during periodic inter-frequency measurement gaps, which may be configured in such a way that each gap may start at an System Frame Number (SFN) and subframe meeting the following conditions: SFN mod T=FLOOR(gapOffset/10); and subframe=gapOffset mod 10; with T=MGRP/10, where MGRP stands for "measurement gap repetition period".

E-UTRAN may need to provide a single measurement gap pattern with constant gap duration for concurrent monitoring of all frequency layers and RATs. Two configurations may be supported by the UE, with MGRP of 40 and 80 ms, both with the measurement gap length (MGL) of 6 ms. In practice, due to the switching time, this may be understood to leave less than 6 but at least 5 full subframes for measurements within each such measurement gap. Shorter MGL has been recently also standardized in LTE.

In LTE, measurement gaps may be configured by the network to enable measurements on the other LTE frequencies and/or other RATs. The gap configuration may be signalled to the UE over RRC protocol, as part of the measurement configuration. The gaps may be common, that is, shared by, for all frequencies, but the UE may measure only one frequency at a time within each gap.

Inter-Frequency Measurements and Measurement Gaps in NR and EN-DC

3GPP has agreed that in NR there may in the future be four measurement gap repetition periods (MGRP), 20 ms, 40, 80 ms, 160 ms and 6 options of measurement gap length (MGL). In total there may be 24 gap patterns.

In the context of EN-DC, two frequency ranges may be important to consider: Frequency 1 (FR1), sub 6 Ghz, and Frequency 2 (FR2), above 24 Ghz. LTE may operate in FR1, while NR may operate in both FR1 and FR2. Depending on implementation, a UE may have one RF chain for both FR1 and FR2, or a separate chain for each. In case of a separate chain, inter-frequency measurement on one may be understood to not affect the transmission/reception on the other, while in the case of a common chain, measurements on one frequency range may require measurement gap and hence interruption of transmission/reception on the other. Thus, for the case of the separate RF chain, the UE may be configured with independent and different gap patterns, one for frequency of FR1, and one for frequency of FR2. On the other hand, for the common RF chain, a UE may need to be configured with one common, per UE, measurement gap.

Whether a UE supports a separate or common RF chain for FR1 and FR2 may be communicated to the network as part of the UE capability information exchange.

Measurement Capability Coordination Background

It was agreed in RAN2 #99bis that:
1: There will be a signalling to coordinate the number of frequency layer to be used in MN and SN.
2: The MN indicates the number of frequency layers that can be used in the SN
3: Re-negotiation (SN signalling to MN for the purpose of asking for a greater number of frequency layer) is not supported (at least in Rel-15).

An Information Element (IE) called maxMeasFreqsSCG is introduced in the RRC inter-node message, SCG-Config-Info [3], for this purpose.

Measurement Gap Coordination

In RAN2 #100, agreements were made regarding how to configure/coordinate measurement gaps.

Agreements:
1 In the case of per UE measurement gap configuration, MN decides the configuration and informs the SN about the configuration.
2 For Dec 17, adopt a solution where:
 a/ For case of a single gap case the network always configures per UE gaps if the UE is configured to measure any inter-freq or inter-RAT carrier or intra-freq cases where gaps are required.
 b/ For the independent gap case the network always configures for the LTE/FR1 gaps if the UE is configured to measure any carrier within the FR1 range, and network always configures for the FR2 gaps if the UE is configured to measure any carrier within the FR2 range.
3 For the independent gap case once EN-DC is setup:
 a/ the MN should inform the measurement gap pattern configuration on FR1 to the SN
 b/ the MN should inform the SN that it wants to measure in FR2 frequency(ies). Some assistance information to the SN to configure the gaps is provided
 c/ the SN should inform the MN that it wants to measure in NR carriers in FR1 range, if the SN has not already received a measurement gap pattern. Some assistance information to the MN to configure the gaps is provided FFS What assistance information is required
4 For the per UE gap case once EN-DC is setup:
 a/ the MN should inform the measurement gap pattern configuration to the SN
 b/ the SN should inform the MN that it wants to measure any inter-freq carrier or intra-freq cases where gaps are required. Some assistance information to the MN to configure the gaps is provided
5 Capability is added to indicate support for independent gap configuration for FR1 and FR2

Measurement Configuration in EN-DC

In RAN2 #98, the following agreements were made regarding on how the MN and SN actually configure the UE for measurement:

Agreements
1: At least, the total number of measured carriers across LTE and NR needs to be coordinated between MN and SN so that it does not go beyond the UE capability.
2: If MN and SN both configure a measurement object on the same carrier frequency then the measurement objects need to be configured consistently.
3: For MCG and SCG, measurements (objects/ID/reportConfigs) can be configured independently by LTE RRC (inter-RAT measurement on NR) and NR RRC (intra-NR measurements on serving and non-serving frequencies). (Noting that for the objects will be configured consistently as described by agreement 2)

Current existing methods of handling the configuration of measurements to be performed by a UE according to the foregoing agreements may lead to underutilizing the measurement capability of the UE. Moreover, considerable delay may be incurred before the measurement may be started, and in addition, the configuration of the measurement gap may not enable the performance of the desired measurements.

SUMMARY

It is an object of embodiments herein to improve the handling of measurements to be performed by a UE in a wireless communications network. It is a particular object of embodiments herein to improve the handling of the configuration of the UE to perform the measurements.

According to a first aspect of embodiments herein, the object is achieved by a method, performed by a first base station. The first base station determines a change in a first set of frequencies associated with one or more measurements to be performed by a user equipment (UE). The first base station then transmits a first message to a second base station comprising information regarding which one or more frequencies in the first set of frequencies are to be changed. The first base station and the second base station serve the UE.

According to a second aspect of embodiments herein, the object is achieved by a method, performed by a second base station. The second base station receives the first message from the first base station. The first message comprises the information regarding which one or more frequencies in the first set of frequencies are to be changed in the one or more measurements to be performed by the UE. The first base station and the second base station serve the UE.

According to a third aspect of embodiments herein, the object is achieved by method, performed by UE. The UE receives, from the first base station, a configuration message. The configuration message specifies one of the following options. In a first option, the configuration message specifies the one or more measurements the UE is to perform with a Master Node (MN) Radio Resource Control (RRC) reconfiguration message, wherein the MN RRC message embeds a Secondary Node (SN) RRC message. The embedded SN RRC message configures the UE with a measurement gap configuration In a second option, the configuration message specifies the measurement gap configuration the UE is to apply with a MN RRC reconfiguration message. The MN RRC message embeds an SN RRC message, wherein the embedded SN RRC message specifies the one or more measurements the UE is to perform. The UE then takes the one or more measurements based on the received configuration message.

According to a fourth aspect of embodiments herein, the object is achieved by a first base station. The first base station is configured to determine the change in the one or more measurements to be performed by the UE. The one or more measurements are configured to be associated with the first set of frequencies. The first base station is also configured to transmit the first message to the second base station. The first message is configured to comprise the information regarding which one or more frequencies in the first set of frequencies are to be changed. The first base station and the second base station are configured to serve the UE.

According to a fifth aspect of embodiments herein, the object is achieved by the second base station. The second base station is configured to receive the first message from the first base station. The first message is configured to comprise the information regarding which one or more frequencies in the first set of frequencies are to be changed in the one or more measurements to be performed by the UE. The first base station and the second base station are configured to serve the UE.

According to a sixth aspect of embodiments herein, the object is achieved by the UE. The UE is configured to receive, from the first base station, the configuration message configured to specify one of the following options. In a first option, the configuration message is configured to specify the one or more measurements the UE is to perform with the MN RRC reconfiguration message. The MN RRC message is configured to embed the SN RRC message. The SN RRC configured to be embedded message is configured to configure the UE with the measurement gap configuration. In a second option, the configuration message is configured to specify the measurement gap configuration the UE is to apply with the MN RRC reconfiguration message. The MN RRC message is configured to embed the SN RRC message, wherein the SN RRC message configured to be embedded is configured to specify the one or more measurements the UE is to perform. The UE is also configured to take the one or more measurements based on the configuration message configured to be received.

By the first base station transmitting the first message to the second base station, comprising information regarding which one or more frequencies in the first set of frequencies are to be changed, the first base station and the second base station may coordinate the measurements they may wish the UE to perform, and may be enabled to not double count a measurement on a same frequency they may both wish the UE to perform a measurement on. Thus, the capability of the UE is not under-utilized. By the UE receiving the configuration message from the first base station, the time of the measurement configuration and/or setup procedures to have the UE perform the one or more measurements may be reduced, since the procedures of measurement capabilities and gap coordination may be combined.

BRIEF DESCRIPTION OF THE DRAWINGS

Examples of embodiments herein are described in more detail with reference to the accompanying drawings, according to the following description.

DETAILED DESCRIPTION

Figure 1:
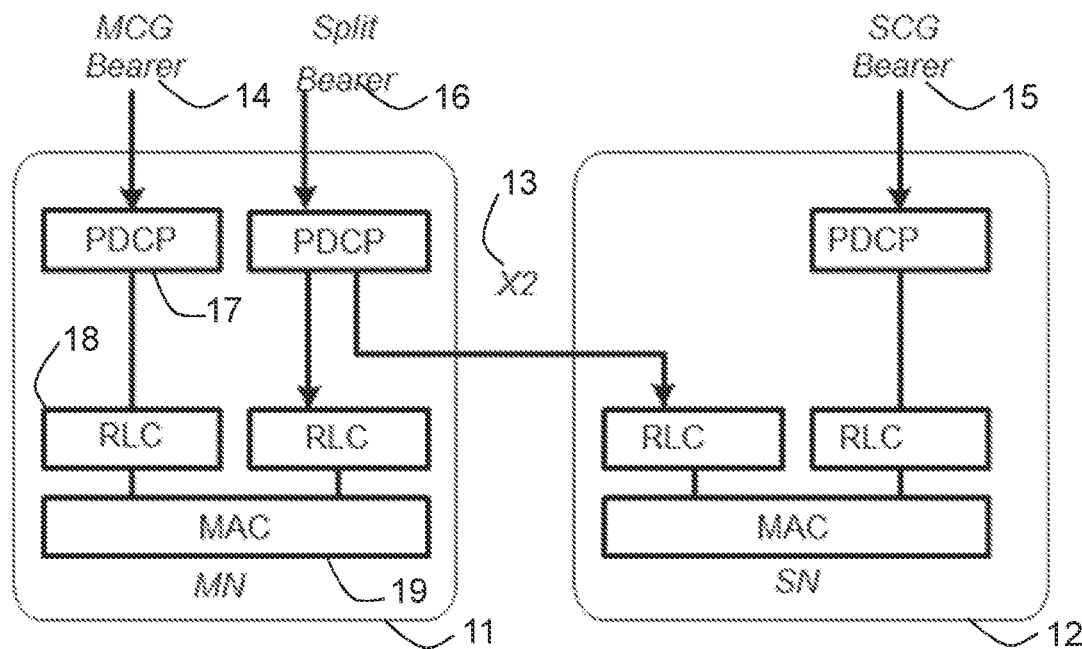
FIG. 1 is a schematic diagram illustrating an exemplary architecture of an LTE DC User Plane (UP).
Figure 2:
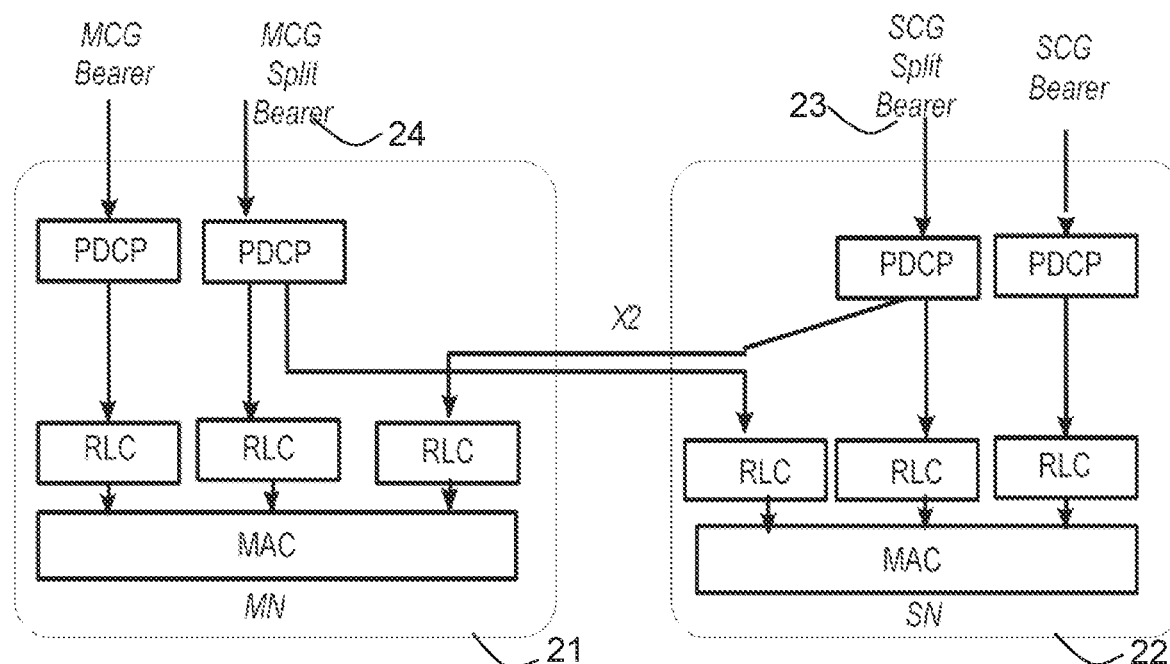
FIG. 2 is a schematic diagram illustrating the UP architectures for LTE-NR tight interworking.
Figure 3:
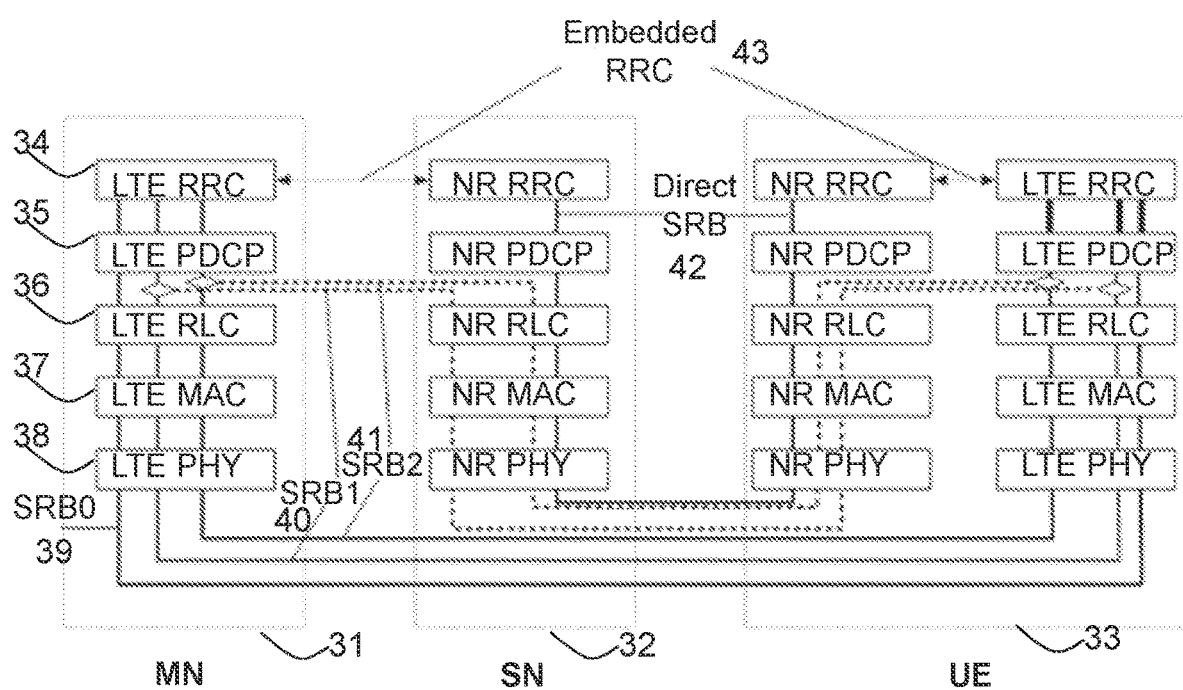
FIG. 3 is a schematic diagram illustrating the Control Plane (CP) architecture for LTE-NR tight interworking.

As part of developing embodiments herein, certain challenge(s) that currently exist which may be associated with use of at least some of the existing methods, and that are not resolved/discussed yet in 3GPP, will first be identified and discussed.

For example, a first challenge is that as discussed above, the MN informs the SN when it wants to configure a UE to measure on NR frequencies. However, this information is generic and not sufficient to provide an optimal measurement gap, e.g., the measurement gap repetition needs may be different depending on how many NR frequencies the UE is going to measure.

A second challenge is that with the agreements referenced above, when the MN has informed the SN of its needs to start measuring on NR frequencies, the SN will configure the measurement gaps and then inform the MN, and only then may the MN be able to configure the UE to start the measurements on the NR frequencies. This may incur considerable delay before the measurement may be started, that is, time to send "measurement needs" message+"processing time at the SN to generate the RRC message towards the UE that configures the measurement gaps"+"time to send the RRC message to the UE"+"time to get the confirmation message from the UE to that RRC message"+"time to generate the message to the MN to inform the latest measurement gap on NR frequencies".

A third challenge is that, according to the agreements described in the Background section, an MN and an SN may both configure a measurement in the same NR frequency. The implication of that is, in this case, that even though the MN and SN may think they are having several measurement configurations, that is, as one measurement each, while from the perspective of the UE, only one measurement is configured. The result of this is a possible underutilization of the UE measurement capability.

To illustrate this problem with an example, the following simple scenario may be considered. In this example scenario, it may be assumed that the maximum total number of NR frequency carriers the UE may measure on, according to its capability, is 5. Also, it may be assumed that the MN may configure the UE to measure on 2 NR frequency carriers. The MN may then inform the SN, as agreed in RAN2 #99bis, that it may measure maximum of 3 NR frequencies, and thereafter, the SN may configure 3 NR frequency carriers. If the MN and SN have configured 2 common NR frequency carriers, the total number of carriers the UE is actually measuring on is 3. That is, 2 common and one unique NR frequency carrier configured by the SN. Since both the MN and the SN may then consider the UE capability limit is reached, they will refrain from configuring measurements on other NR frequencies. This means that the measurement capabilities of the UE are not fully utilized.

As a further particular illustrative example of this challenge, it may be considered a UE that supports 5 measurements, and the MN has configured the SN to measure a max of 2 measurements, as agreed in RAN2, see section 2.1.6. It may be assumed in this example that the MN has configured measurements on LTE freq LTE_f1 and NR freq NR_f1 and NR freq_2. It may also be assumed the SN has also configured measurements on the two NR frequencies NR_f1 and NR_f2. From the point of view of the UE, it has 3 measurements to perform, since performing a measurement on NR_f1 or NR_f2 is the same from a lower/physical (PHY) layer perspective, regardless of the measurement configuration coming from the MN or SN. The only difference between the MN and SN configured measurements on NR_f1 is higher layer processing, like L3 filtering. Thus, the UE is still capable of performing measurements on two more frequencies. But since both the MN and SN are not aware of this, each thinking it has reached the UE capability limit, they will not be able to configure any new measurements, until a measurement configuration on one of the frequencies being measured is released. Thus, effectively underutilizing the measurement capability of the UE by 40% (⅖).

Certain aspects of the present disclosure and their embodiments may provide solutions to these or other challenges. Embodiments herein may be generally understood to relate to measurement configuration coordination between base stations. Embodiments herein may also be generally understood to relate to measurement gap coordination between base stations. Particular embodiments herein may be understood to relate to measurement capability and gap coordination in EN-DC.

Some of the embodiments contemplated herein will now be described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the embodiments and/or examples herein are not mutually exclusive. Components from one embodiment or example may be tacitly assumed to be present in another embodiment or example and it will be obvious to a person skilled in the art how those components may be used in the other exemplary embodiments and/or examples.

Figure 4:
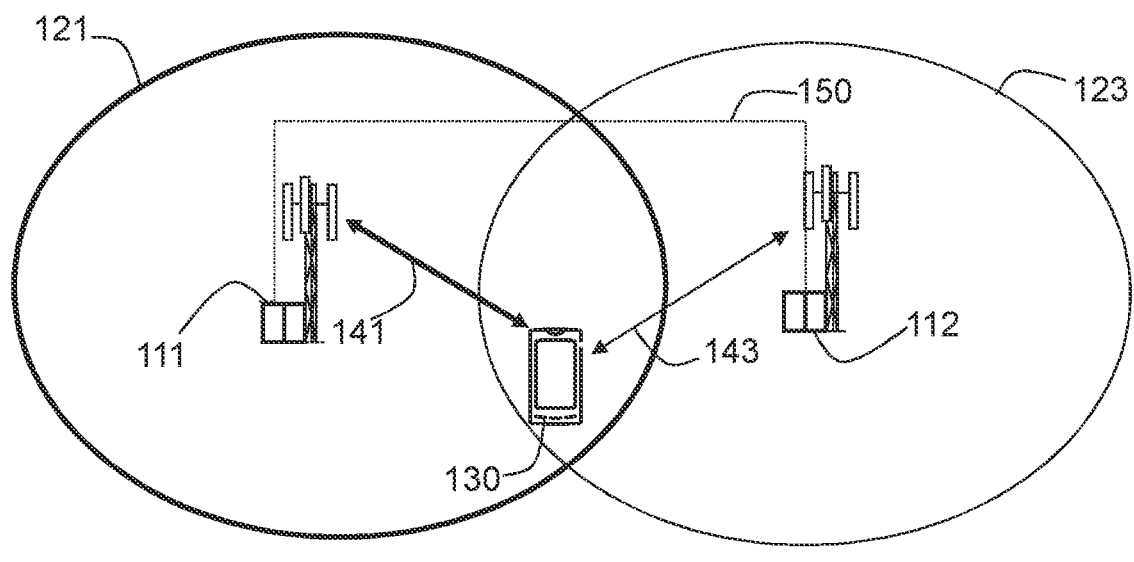
FIG. 4 is a schematic diagram an example of a wireless communications network, according to embodiments herein.

FIG. 4 depicts a non-limiting example of a wireless network or wireless communications network 100, sometimes also referred to as a wireless communications system, cellular radio system, or cellular network, in which embodiments herein may be implemented. The wireless communications network 100 may typically be a 5G system, 5G network, or Next Gen System or network. The wireless communications network 100 may also support other technologies such as, for example, Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, WCDMA, Universal Terrestrial Radio Access (UTRA) TDD, GSM network, GERAN network, Ultra-Mobile Broadband (UMB), EDGE network, network comprising any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system. The wireless communications network may also be understood as a non-cellular system, comprising network nodes which may serve receiving nodes, such as wireless devices, with serving beams. This may be a typical case, e.g., a in a 5G network.

The wireless communications network 100 comprises a plurality of network nodes, whereof a first base station 111 and a second base station 112 are depicted in the non-limiting example of FIG. 4. In other examples, which are not depicted in FIG. 4, any of the first base station 111 and the second base station 112 may be a distributed node, such as a virtual node in the cloud, and may perform its functions entirely on the cloud, or partially, in collaboration with a radio network node.

Each of the first base station 111 and the second base station 112 may be understood to be a radio network node. That is, a transmission point such as a radio base station, for example a gNB, an eNB, or any other network node with similar features capable of serving a wireless device, such as a user equipment or a machine type communication device, in the wireless communications network 100.

The wireless communications network 100 covers a geographical area which may be divided into cell areas, wherein each cell area may be served by a network node, although, one radio network node may serve one or several cells. The wireless communications network 100 may comprise at least one of: a first group of cells and a second group of cells. The first group of cells may be, for example, a MCG. The second group of cells may be, for example, a SCG. The first group of cells may comprise a first cell 121, and one or more second cells. In the non-limiting example depicted FIG. 4, only the first cell 121 is depicted to simplify the Figure. The first cell 121 may be a primary cell (PCell) and each of the one or more second cells may be a secondary cell (SCell). In the non-limiting example depicted in FIG. 4, the first base station 111 is a radio network node that serves the first cell 121. The first base station 111 may, in some examples, serve receiving nodes, such as wireless devices, with serving beams.

The second group of cells may comprise a third cell 123, and one or more fourth cells. In the non-limiting examples depicted in FIG. 4, only the third cell 123 is depicted to simplify the Figure. The third cell 123 may be a primary secondary cell (PSCell) and each of the one or more fourth cells may be a secondary cell (SCell). In the non-limiting example depicted in FIG. 4, the second base station 112 is a radio network node that serves the third cell 123. Even in examples wherein the wireless communications network 100 may not be referred to as a cellular system, the second base station 112 may serve receiving nodes, such as wireless devices, with serving beams.

The first base station 111, in some examples, may be a MN.

The second base station 112, in some examples, may be a SN.

In LTE, any of the first base station 111 and the second base station 112 may be referred to as an eNB. In some examples, the first base station 111 may be an eNB as MN, and the second base station 112 may be a gNB as SN. It may be noted that although the description of embodiments herein may focus on the LTE-NR tight interworking case, where the LTE is the master node, embodiments herein may be understood to also be applicable to other DC cases, such as LTE-NR DC, where NR is the master and LTE is the secondary node (NE-DC), NR-NR DC, where both the master and secondary nodes are NR nodes, or even between LTE/NR and other RATs. In some examples, the first base station 111 may be a gNB as MN, and the second base station 112 may be an eNB as SN.

Any of the first base station 111 and the second base station 112 may be of different classes, such as, e.g., macro base station, home base station or pico base station, based on transmission power and thereby also cell size. Any of the first base station 111 and the second base station 112 may support one or several communication technologies, and its name may depend on the technology and terminology used. In 5G/NR, any of the first base station 111 and the second base station 112 may be referred to as a gNB and may be directly connected to one or more core networks, which are not depicted in FIG. 4.

A plurality of user equipments are located in the wireless communication network 100, whereof a user equipment 130, is depicted in the non-limiting example of FIG. 4. The user equipment 130 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the user equipments comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) device, device equipped with a wireless interface, such as a printer or a file storage device, modem, or any other radio network unit capable of communicating over a radio link in a communications system. The user equipment 130 comprised in the wireless communications network 100 is enabled to communicate wirelessly in the wireless communications network 100. The communication may be performed e.g., via a RAN, and possibly the one or more core networks, which may be comprised within the wireless communications network 100.

The user equipment 130 may be configured to communicate within the wireless communications network 100 with the first base station 111 in the first cell 121 over a first link 141, e.g., a radio link. The user equipment 130 may be configured to communicate within the wireless communications network 100 with the first base station 111 in each of the one or more second cells over a respective second link, e.g., a radio link. The user equipment 130 may be configured to communicate within the wireless communications network 100 with the second base station 112 in the third cell 123 over a third link 143, e.g., a radio link. The user equipment 130 may be configured to communicate within the wireless communications network 100 with the second base station 112 in each of the one or more fourth cells 124 over a respective fourth link, e.g., a radio link.

The first base station 111 and the second base station 112 may be configured to communicate within the wireless communications network 100 over a fifth link 150, e.g., a wired link or an X2 interface.

In general, the usage of "first" and/or "second" herein may be understood to be an arbitrary way to denote different elements or entities and may be understood to not confer a cumulative or chronological character to the nouns they modify.

Some of the embodiments contemplated herein will now be described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Embodiments of a method, performed by the first base station 111, will now be described with reference to the flowchart depicted in FIG. 5. The method may be understood to be for handling one or more measurements to be performed by the user equipment, UE, 130. The first base station 111 may be understood to serve the UE 130 with the second base station 112 in the wireless communication network 100 in a dual connectivity setup.

In some embodiments all the actions may be performed. In some embodiments, two or more actions may be performed. In FIG. 5, optional actions are indicated with dashed lines. It should be noted that the examples herein are not mutually exclusive. Several embodiments are comprised herein. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description.

Action 501

During the course of communications in the wireless communications network 100, the UE 130 may perform measurements on frequencies or carriers it may be able to detect, based on a configuration provided by the first base station 111 serving it. At some point, the first base station 111 may need to change the measurements the UE 130 may be performing on other carriers. For example, if the load of the first base station 111 has become too high, or a radio quality is degrading in a current frequency and there may be a risk of radio link failure declaration, the first base station 111 may need to handover the UE 130 to another carrier or frequency, and the first base station 111 may need to have the UE 130 perform measurements on other frequencies. In yet another example scenario, the first base station 111 may want to find different SCells in different frequencies to establish the carrier aggregation feature. In other examples, e.g., if the UE 130 is close to the boarder of the first cell 121, the first base station 111 may need the UE 130 to refrain from performing measurements on some frequencies. In this Action 501, the first base station 111 determines a change in one or more measurements to be performed by the UE 130. The one or more measurements are associated with a first set of frequencies.

Determining may be understood as, e.g., calculating.

The change in the one or more measurements may comprise adding or removing one or more frequencies in the first set of frequencies to be measured.

That the one or more measurements are associated with the first set of frequencies may be understood to mean that the one or more measurements are to be performed or are to be refrained to be performed on frequencies comprised in the first set of frequencies.

In some embodiments, the first set of frequencies may be NR frequencies.

By performing the determining in this Action 501, the first base station 111 may be enabled to dynamically adjust the measurements the UE 130 may be performing based on particular circumstances in the wireless communications network 100 affecting the UE 130.

Action 502

Since the first base station 111 serves the UE 130 with the second base station 112, and the UE 130 may be understood to have a measurement capability in terms of the number of frequencies it may be capable of performing measurements on at a certain time, the first base station 111 may need to coordinate with the second base station 112 the change it may have determined to make in the one or more measurements to be performed by the UE 130. In order to address the possible under-utilization of the measurement capability of the UE 130, while avoiding the possibility of exceeding the measurement capability of the UE 130, the first base station 111 may inform the second base station 112, not only that it is going to configure the UE 130 to, for example, perform a measurement on a particular, e.g., NR, frequency, but also the actual frequency carrier(s), referred to herein simply as "frequency(ies)" or "frequencies", that it may be going to configure the UE 130 to measure. This way, the first base station 111 may enable the second base station 112 to configure additional measurements without exceeding the capability of the UE 130.

In accordance with the foregoing, in this Action 502, the first base station 111 transmits a first message to the second base station 112. The first message comprises information regarding which one or more frequencies in the first set of frequencies are to be changed. As stated earlier, the first base station 111 and the second base station 112 serve the UE 130.

The transmitting in this Action 502 may be implemented, for example, via the fifth link 150, e.g., an X2 interface.

The information may be for example, in the form of an Information Element, an index, one or more identifiers of the frequencies, etc. . . . . .

The first base station 111 and the second base station 112 may be serving the UE 130 in a DC setup, wherein one of the base stations may be a Master Node (MN) and the other may be a Secondary Node (SN). In some embodiments, the first base station 111 may be the MN, and the second base station 112 may be the SN. In other embodiments, the first base station 111 may be the SN, and the second base station 112 may be the MN.

By transmitting the first message in this Action 502, the first base station 111, as MN, may informs the second base station 112, as SN about, e.g., the NR frequency carriers that it may be adding or removing from its measurements.

In other embodiments, by transmitting the first message in this Action 502, the first base station 111, as SN may inform the second base station 112, as MN, about the frequency carriers that it may be adding or removing from its measurements.

Considering this setup, the problem of the existing methods discussed earlier may be solved if the MN, e.g., the first base station 111, informs the SN, e.g., the second base station 112, not only with an indication that it may be going to configure the UE 130 to perform a measurement on an NR frequency as agreed in RAN2 #100, but also, according to embodiments herein, with the actual NR frequency carrier(s) that it may be going to configure the UE 130 to measure. This way, the SN may be able to configure additional measurements without passing, that is, exceeding, the capability of the UE 130. Later, the SN may inform the MN with the NR frequency carriers it is going to configure the UE 130 to measure on. The MN may realize that 2 of the NR carriers it has configured the UE 130 with are common with the one the SN has also configured. Therefore, the MN may be enabled to configure additional measurement(s) on other NR frequencies.

It may be noted also that if the MN, or the SN, removes one of the common frequency carriers and adds a new unique NR frequency, it may need to inform the SN, or MN, of this removal and addition. The reason is that if the removed frequency was a common frequency and the newly added is a unique frequency, the number of total frequencies may exceed the UE capability.

In accordance with the foregoing, the MN may inform the SN, about the NR frequency carriers that it may be adding or removing from its measurements. Similarly, the SN may inform the MN about the frequency carriers that it may be adding or removing from its measurements.

Some examples in this disclosure focus on the case of EN-DC, where LTE is the master and NR is the secondary node.

For example, in an EN-DC scenario, the first base station 111 as MN, according to examples Action 502, may send an information message which may include information of the frequencies and/or carriers that are being added and/or removed to be measured, to the second base station 112 as SN, whenever it may add and/or removes measurements on NR frequencies.

However, the method may be understood to be equally applicable to other interworking scenarios such as NE-DC, where NR is the master and LTE is the secondary.

The first message may be an RRC inter-node message, from MN to SN, e.g., an SCG-ConfigInfo [3]. To restrict the number of NR frequency carriers the SN, e.g., the second base station 112, may measure, there may be an IE called maxMeasFreqsSCG, which may be introduced in the RRC inter-node message, from MN to SN, SCG-ConfigInfo [3]. Measurement objects on the same frequency carrier configured by both MN and SN may be counted as one. In addition to this, the UE 130 may also need to monitor other RATs, e.g., NR, E-UTRA FDD and E-UTRA TDD layers. Therefore, in order to achieve a correct number, it may be understood to be beneficial if both the MN and SN need to know the NR carriers the UE 130 may be currently monitoring.

By transmitting the first message in this Action 502, the first base station 111 may enable that the first base station 111 and the second base station 112 do not double count the measurement on the same frequency as described above. Thus, the capability of the UE 130 is not under-utilized. For example, the first base station 111 as SN may inform the second base station 112 as MN whenever it may add and/or remove measurements, which may include information of the frequencies and/or carriers that may be being added and/or removed to be measured. The second base station 112 as MN may then use this info to know how many measurements it may still setup.

Moreover, getting information about the NR carriers that the MN may be configuring the UE 130 to measure on may be understood to also make it possible for the SN to set more optimal measurement gaps. For example, if the SN knows that the MN is going to configure the UE 130 to measure on several NR frequencies, it may set up a shorter measurement gap period/repetition to accommodate that, while a longer repetition may be configured if only one frequency is being measured. Another possibility is the information to be used not only for the gap period and/or repetition, but also for the gap duration, because depending on the frequencies being measured, a different gap duration may be appropriate.

Action 503

In accordance with the foregoing, in this Action 503, the first base station 111 may receive, from the second base station 112, an inter-node Radio Resource Control (RRC) message comprising a measurement gap configuration. The measurement gap configuration may be based on the transmitted first message from the first base station 111.

The receiving in this Action 503 may be implemented, for example, via the fifth link 150, e.g., an X2 interface.

Since the first base station 111 and the second base station 112 communicate about the frequencies that they may be planning on configuring, the measurement gap in the received measurement gap configuration may be understood to be adjusted to fit the current needs of the UE 130.

In some examples, in response to the first message from the first base station 111 as MN, e.g., the info message, the first base station 111 may receive from the second base station 112 as SN an ACK via X2, that may also optionally contain the measurement gap configuration in an NR RRC connection reconfiguration message. The first base station 111 as MN may then be enabled to send to the UE 130 the measurement configuration that may configure the UE 130 in an LTE RRC message, embedding the NR RRC message that the second base station 112 as SN may have just sent.

Action 504

In this Action 504, the first base station 111 may transmit, to the UE 130, a configuration message. The contents of the configuration message may be based on whether the first base station 111 is the MN or an SN.

The transmitting may be implemented, for example, via the first link 141, e.g., radio link.

In some embodiments, wherein the first base station 111 may be an MN and the second base station 112 may be an SN, the first base station 111 may, in this Action 504, transmit, to the UE 130, a configuration message specifying the one or more measurements the UE 130 is to perform, with an MN RRC reconfiguration message. The MN RRC message may be embedding an SN RRC message. The embedded SN RRC message may configure the UE 130 with the measurement gap configuration received from the SN.

In some embodiments, the first base station 111 may wait to receive the measurement gap configuration from the second base station 112 indicating that a gap is configured before transmitting the configuration message to the UE 130 specifying the one or more measurements the UE 130 is to perform. For example, if it is the first time the first base station 111 as MN is configuring a measurement on NR frequencies, and/or if it has not received any measurement gap information from the second base station 112 as SN previously, the first base station 111 as MN may wait for a confirmation from the second base station 112 as SN that a gap is configured before configuring the UE 130 with that measurement.

By transmitting the MN RRC message to the UE 130, the measurement configuration may be performed in one procedure. For example, the first base station 111, as MN, may send the NR frequency it may be planning on configuring the UE 130 to measure on, to the second base station 112 as SN. The second base station 112, as SN, may then be enabled to configure the gap and respond back including the SN RRC message that may indicate the gap to the UE 130. The first base station 111, as MN, may then send an RRC message that includes the measurement configuration from the MN, as well as an embedded SN RRC message that may configure the gap.

In some embodiments, wherein the first base station 111 may be an SN and the second base station 112 may be the MN, the first base station 111 may, in this Action 504, transmit, to the UE 130, a configuration message specifying the measurement gap configuration the UE 130 may need to apply with an MN RRC reconfiguration message. The MN message may be embedding an SN RRC message. The embedded SN RRC message may specify the one or more measurements the UE 130 may need to perform.

By transmitting the MN RRC message to the UE 130, the measurement configuration may be performed in one procedure. It may no longer be necessary to wait double round-trip time to implement the configurations that may be necessary to perform the one or more measurements. The double round trip time here may be understood to refer to potentially two X2 messages that may need to be sent from MN to SN in existing methods. In a first request, the first round trip time may be understood to be associated to a message that the MN, may send to the SN about the NR related measurement configuration change and the associated ACK from the SN, if the MN, may configure the measurement or not. In a second request, the second round trip time may be understood to be associated to the message that may be sent from the MN to the SN, to request for the measurement gap configuration associated to the FR2 frequencies where the MN may be intending to configure the NR measurements and the associated reply from the SN to indicate the measurement gap configuration associated with the request. Embodiments herein enable to avoid the need for second round trip of X2/Xn messages by allowing the measurement gap configuration to be exchanged as part of an ACK message for the first request.

In some embodiments, the MN RRC message may be an LTE RRC message, and the SN message may be an NR RRC reconfiguration message.

Embodiments of a method, performed by the second base station 112, will now be described with reference to the flowchart depicted in FIG. 6. The method may be understood to be for handling the one or more measurements to be performed by the UE 130. The first base station 111 may be understood to serve the UE 130 with the second base station 112 in the wireless communication network 100 in a dual connectivity setup.

In some embodiments all the actions may be performed. In some embodiments, one action may be performed. In FIG. 6, the optional action is indicated with dashed lines. It should be noted that the examples herein are not mutually exclusive. Several embodiments are comprised herein. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description.

The detailed description of some of the following corresponds to the same references provided above, in relation to the actions described for the first base station 111 and will thus not be repeated here to simplify the description, however, it applies equally. For example, the first set of frequencies may be NR frequencies.

Action 601

In this Action 601, the second base station 112 receives the first message from the first base station 111. The first message comprises the information regarding which one or more frequencies in the first set of frequencies are to be changed in the one or more measurements to be performed by the UE 130. The first base station 111 and the second base station 112 serve the UE 130, e.g., in a DC setup.

The receiving in this Action 601 may be implemented, for example, via the fifth link 150, e.g., an X2 interface.

The one or more frequencies in the first set of frequencies that are to be changed may be understood to result in a change in the one or more measurements that are to be performed by the UE 130. The change in the one or more measurements may comprise adding or removing the one or more frequencies in the first set of frequencies to be measured.

For example, the second base station 112, as SN, may then use the info received in the first message to know how many measurements it may still setup, that is, it may then not count the measurements on the same frequencies towards the measurement limit set by the first base station 111 as MN during the EN-DC setup. Also, when a measurement is removed by the first base station 111 as MN, the SN may start counting the measurements on the concerned frequencies towards the measurement limit.

The receiving, in this Action 601, of the first message form the first base station 111 may be understood to enable measurement gap coordination between the first base station 111 and the second base station 112. Also, as stated earlier, in some embodiments, the first base station 111 may be the MN, and the second base station 112 may be an SN. The second base station 112, as SN, may then use the assistance information provided to it from the first base station 111, as MN, according to Action 601, to set the appropriate measurement gap.

As mentioned earlier, there is an open issue from RAN2 #100 regarding what assistance information may be required by the SN to configure a proper measurement gap for NR frequencies. The reception of the details of the exact carriers that the MN may be adding or removing from the measurement configuration of the UE 130, according to some embodiments herein, may be understood to be sufficient for the SN to configure a proper measurement gap. Accordingly, the second base station 112, as SN, may be enabled by receiving, in this Action 601 the first message to use the assistance information provided to it from the first base station 111 as MN, to set the appropriate measurement gap.

In some embodiments, the first base station 111 may be an SN and the second base station 112 may be an MN.

Action 602

In this Action 602, the second base station 112 sends, to the first base station 111, the inter-node RRC message comprising the measurement gap configuration. The measurement gap configuration may be understood to be based on the received first message from the first base station 111.

The sending in this Action 602 may be implemented, for example, via the fifth link 150, e.g., an X2 interface.

By sending the inter-node RRC message to the first base station 111 in this Action 602, the second base station 112 may enable the first base station 111 to embed the RRC message that may configure the UE 130 with the measurement gap configuration.

In other examples, the second base station 112 may send, to the first base station 111, the inter-node RRC message specifying the one or more measurements the UE 130 is to perform. In such examples, the second base station 112 may enable the first base station 111 to embed the RRC message that may configure the UE 130 with the one or more measurements the UE 130 may need to perform.

In some examples, in response to the first message from the first base station 111 as MN, e.g., the info message, the second base station 112 as SN may send to the first base station 111 an ACK via X2, that may also optionally contain the measurement gap configuration in an NR RRC connection reconfiguration message.

Figure 5:
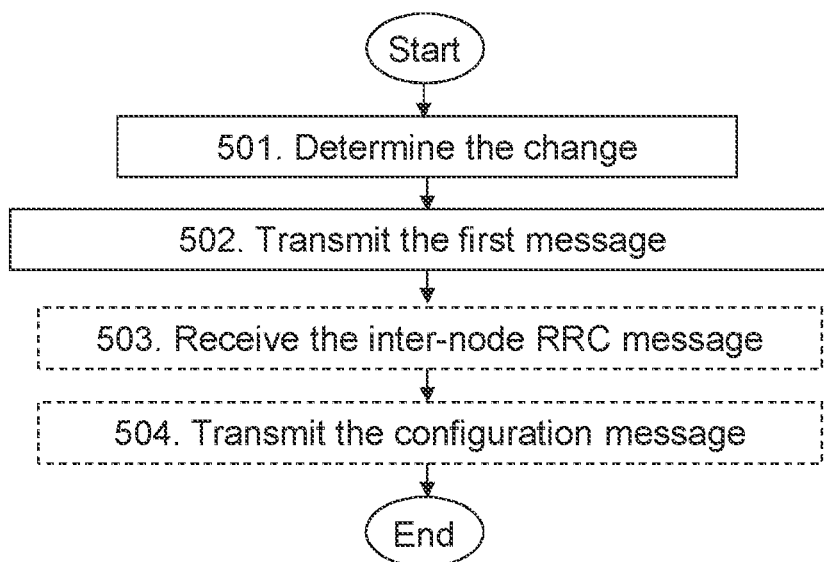
FIG. 5 is a flowchart depicting a method in a first base station, according to embodiments herein.
Figure 6:
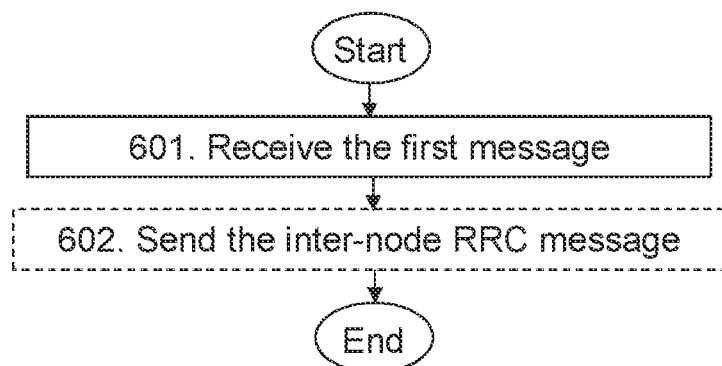
FIG. 6 is a flowchart depicting a method in a second base station, according to embodiments herein.

Note also that, in relation to the methods described in FIG. 5 and/or FIG. 6, if the MN, or the SN, removes one of the common frequency carriers and adds a new unique NR frequency, it may need to inform the SN, or the MN, of this removal and addition. The reason is that if the removed frequency was a common frequency and the newly added is a unique frequency, the number of total frequencies may exceed the capability of the UE 130.

In all the above, it may be assumed that the MN and the SN keep track of the NR carriers being configured by themselves as well as by the other node.

During initial EN-DC setup, the MN may already communicate any NR frequencies that it has already configured the UE with in the sgNB addition message.

Figure 7:
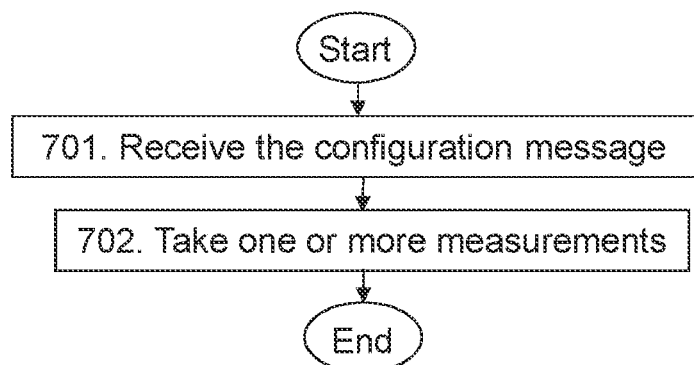
FIG. 7 is a flowchart depicting a method in a user equipment, according to embodiments herein.

Embodiments of a method, performed by the user equipment 130, will now be described with reference to the flowchart depicted in FIG. 7. The method may be understood to be for handling the one or more measurements to be performed by the UE 130. The UE 130 may be served by the first base station 111 and by the second base station 112 in the wireless communication network 100 in a dual connectivity setup.

In some embodiments, the UE 130 may be served by the first base station 111 as the MN, and by the second base station 112, wherein the second base station 112 is a SN.

In other embodiments, the UE 130 may be served by the first base station 111 as an SN, and by the second base station 112 as the MN.

It should be noted that the examples herein are not mutually exclusive. Several embodiments are comprised herein. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description.

The detailed description of some of the following corresponds to the same references provided above, in relation to the actions described for the first base station 111 and will thus not be repeated here to simplify the description, however, it applies equally. For example, the first set of frequencies may be NR frequencies.

Action 701

In this Action 701, the user equipment 130 receives, from the first base station 111, the configuration message. The configuration message specifies one of the following two options. In a first option, the configuration message specifies the one or more measurements the UE 130 is to perform with the MN RRC reconfiguration message. In this first option, the MN RRC message embeds the SN RRC message, wherein the embedded SN RRC message configures the UE 130 with a measurement gap configuration. In a second option, the configuration message specifies the measurement gap configuration the UE 130 is to apply with the MN RRC reconfiguration message. In this second option, the MN RRC message embeds the SN RRC message, wherein the embedded SN RRC message specifies the one or more measurements the UE 130 is to perform.

The first option may correspond to the embodiments wherein the UE 130 may be served by the first base station 111 as the MN, and by the second base station 112, wherein the second base station 112 is a SN The second option may correspond to the embodiments wherein the UE 130 may be served by the first base station 111 as an SN, and by the second base station 112 as the MN The transmitting may be implemented, for example, via the first link 141, e.g., radio link.

In some embodiments, the MN RRC message may be an LTE RRC message, and the SN message may be an NR RRC reconfiguration message.

By receiving the configuration message from the first base station 111 in this Action 701, the configuration performed may be understood to be improved, since the network, that is, MN and SN, may be enabled to configure all measurements to the UE 130 as per its capability, dynamically. Furthermore, the time of the measurement configuration and/or setup procedures to have the user equipment 130 perform the one or more measurements may be reduced, by combining the procedures of measurement capabilities and gap coordination, which may be understood to result in fewer inter-node message exchanges.

Action 702

In this Action 702, the user equipment 130 takes the one or more measurements based on the received configuration message.

Taking may be understood as, e.g., performing.

According to the foregoing, various embodiments are described herein which address one or more of the issues disclosed herein. Certain embodiments may provide one or more of the following technical advantage(s). Some embodiments may enable the utilization of the maximum measurement capability of the UE 130, that is, its UE measurement capability, in, e.g., an EN-DC scenario. This may be understood to make it possible to utilize the many frequency layers that the network may have deployed to serve its users.

Some embodiments may combine the procedures of measurement capabilities and gap coordination and may reduce the time of the measurement configuration/setup procedures.

Some embodiments may allow an SN to setup an optimal gap pattern for NR measurements based on the needs of the MN and/or the UE. According to embodiments herein, an MN may inform an SN about the NR frequency carriers that it may be adding or removing from its measurements. The SN may inform the MN about the frequency carriers that it may be adding or removing from its measurements. The SN may then use the assistance information provided to it from the MN, according to Actions 503 and 601, to set the appropriate measurement gap.

Figure 8:
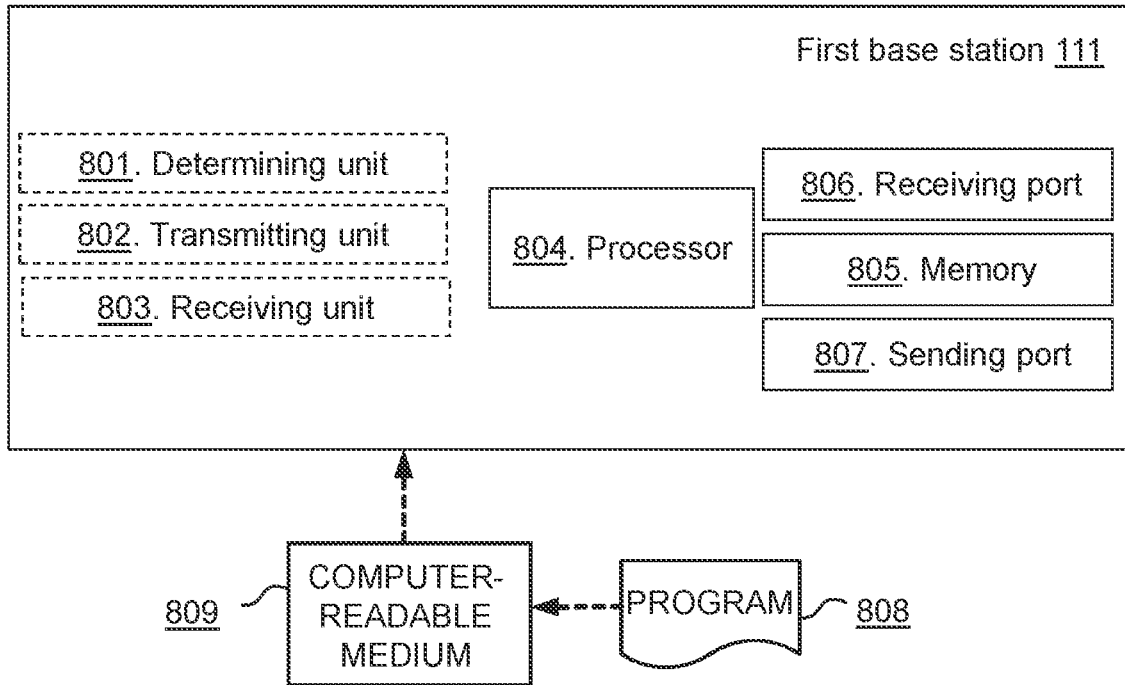
FIG. 8 is a schematic block diagram illustrating embodiments of a first base station, according to embodiments herein.
Figure 8:
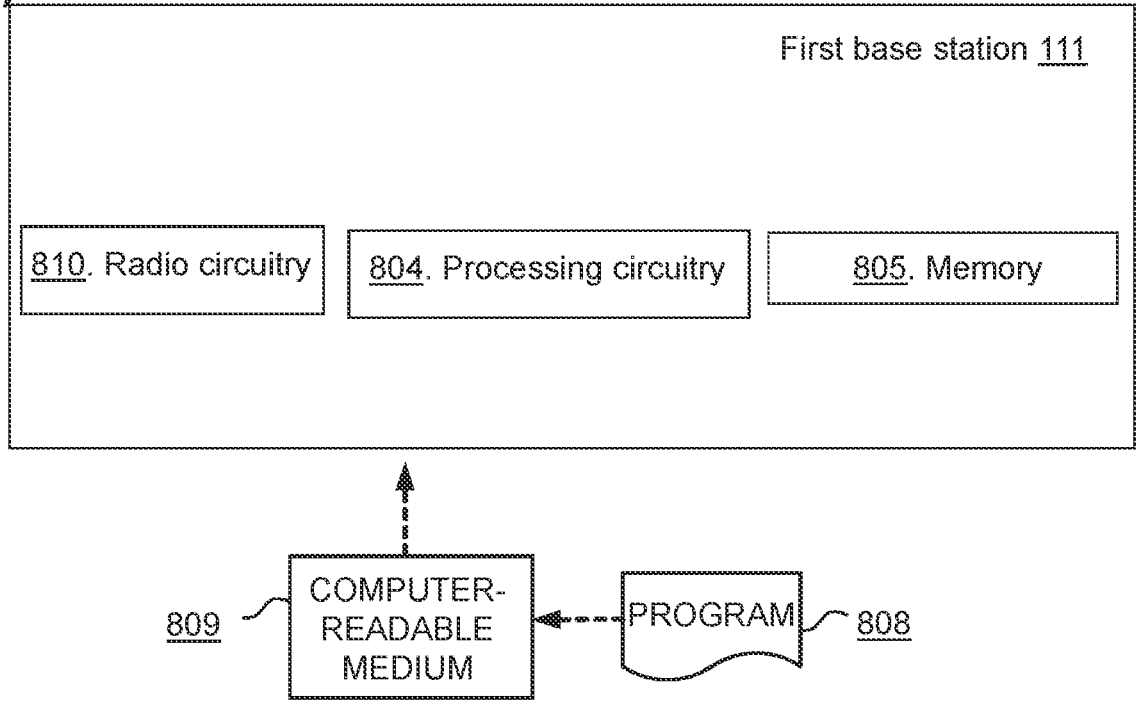

FIG. 8 depicts two different examples in panels a) and b), respectively, of the arrangement that the first base station 111 may comprise to perform the method actions described above in relation to FIG. 5. In some embodiments, the first base station 111 may comprise the following arrangement depicted in FIG. 8a. The first base station 111 may be understood to be for handling one or more measurements to be performed by the UE 130. The first base station 111 may be understood to serve the UE 130 with the second base station 112 in the wireless communication network 100 in a dual connectivity setup.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first base station 111 and will thus not be repeated here. For example, the first base station 111 may be a NR gNB.

In FIG. 8, optional modules are indicated with dashed boxes.

The first base station 111 is configured to perform the determining of Action 501, e.g., by means of a determining unit 801 within the first base station 111, configured to determine the change in the one or more measurements to be performed by the UE 130. The one or more measurements are configured to be associated with the first set of frequencies.

The first set of frequencies may be configured to be NR frequencies.

The first base station 111 is also configured to perform the transmitting of Action 502, e.g., by means of a transmitting unit 802 within the first base station 111, configured to transmit the first message to the second base station 112. The first message is configured to comprise information regarding which one or more frequencies in the first set of frequencies are to be changed. The first base station 111 and the second base station 112 are configured to serve the UE 130.

In some embodiments, the change in the one or more measurements may be configured to comprise adding or removing one or more frequencies in the first set of frequencies configured to be measured.

In some embodiments, the first base station 111 may be further configured to perform the receiving of Action 503, e.g., by means of a receiving unit 803 within the first base station 111, configured to receive, from the second base station 112, the inter-node RRC message configured to comprise the measurement gap configuration. The measurement gap configuration may be configured to be based on the first message configured to be transmitted from the first base station 111.

In some embodiments, the first base station 111 may be configured to wait to receive the measurement gap configuration from the second base station 112 configured to indicate that the gap is configured, before transmitting the configuration message to the UE 130 configured to specify the one or more measurements the UE 130 is to perform.

In some embodiments, the first base station 111 may be configured to be an MN, and the second base station 112 may be configured to be an SN.

In some embodiments, the first base station 111 may be configured to, e.g., by means of the transmitting module 802 within the first base station 111, further configured to, transmit, to the UE 130, the configuration message configured to specify the one or more measurements the UE 130 is to perform with the MN RRC reconfiguration message. The MN RRC message may be configured to embed the SN RRC message. The SN RRC message configured to be embedded may be configured to configure the UE 130 with the measurement gap configuration configured to be received from the SN.

In some embodiments, the first base station 111 may be configured to be an SN, and the second base station 112 may be configured to be an MN.

In some embodiments, the first base station 111 may be configured to, e.g., by means of the transmitting module 802 within the first base station 111, further configured to, transmit, to the UE 130, the configuration message configured to specify the measurement gap configuration the UE 130 is to apply with the MN RRC reconfiguration message. The MN message may be configured to embed an SN RRC message. The SN RRC message configured to be embedded may be configured to specify the one or more measurements the UE 130 is to perform.

The MN RRC message may be configured to be an LTE RRC message, and the SN message may be configured to be an NR RRC reconfiguration message.

The embodiments herein in the first base station 111 may be implemented through one or more processors, such as a processor 804 in the first base station 111 depicted in FIG. 8*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first base station 111. One such carrier may be in the form of a CD ROM disc. It is however feasible with other data carriers such as a memory stick. The computer program code may furthermore be provided as pure program code on a server and downloaded to the first base station 111.

The first base station 111 may further comprise a memory 805 comprising one or more memory units. The memory 805 is arranged to be used to store obtained information, store data, configurations, schedulings, and applications etc. to perform the methods herein when being executed in the first base station 111.

In some embodiments, the first base station 111 may receive information from, e.g., the second base station 112 and/or the user equipment 130, through a receiving port 806. In some embodiments, the receiving port 806 may be, for example, connected to one or more antennas in first base station 111. In other embodiments, the first base station 111 may receive information from another structure in the wireless communications network 100 through the receiving port 806. Since the receiving port 806 may be in communication with the processor 804, the receiving port 806 may then send the received information to the processor 804. The receiving port 806 may also be configured to receive other information.

The processor 804 in the first base station 111 may be further configured to transmit or send information to e.g., the second base station 112 and/or the user equipment 130, or another structure in the wireless communications network 100, through a sending port 807, which may be in communication with the processor 804, and the memory 805.

Those skilled in the art will also appreciate that the determining unit 801, the transmitting unit 802, and the receiving unit 803 described above may refer to a combination of analog and digital modules, and/or one or more processors configured with software and/or firmware, e.g., stored in memory, that, when executed by the one or more processors such as the processor 804, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 801-803 described above may be implemented as one or more applications running on one or more processors such as the processor 804.

Thus, the methods according to the embodiments described herein for the first base station 111 may be respectively implemented by means of a computer program 808 product, comprising instructions, i.e., software code portions, which, when executed on at least one processor 804, cause the at least one processor 804 to carry out the actions described herein, as performed by the first base station 111. The computer program 808 product may be stored on a computer-readable storage medium 809. The computer-readable storage medium 809, having stored thereon the computer program 808, may comprise instructions which, when executed on at least one processor 804, cause the at least one processor 804 to carry out the actions described herein, as performed by the first base station 111. In some embodiments, the computer-readable storage medium 809 may be a non-transitory computer-readable storage medium, such as a CD ROM disc, or a memory stick. In other embodiments, the computer program 808 product may be stored on a carrier containing the computer program 808 just described, wherein the carrier is one of an electronic signal, optical signal, radio signal, or the computer-readable storage medium 809, as described above.

The first base station 111 may comprise a communication interface configured to facilitate communications between the first base station 111 and other nodes or devices, e.g., the second base station 112 and/or the user equipment 130. The interface may, for example, include a transceiver configured to transmit and receive radio signals over an air interface in accordance with a suitable standard.

In other embodiments, the first base station 111 may comprise the following arrangement depicted in FIG. 8b. The first base station 111 may comprise a processing circuitry 804, e.g., one or more processors such as the processor 804, in the first base station 111 and the memory 805. The first base station 111 may also comprise a radio circuitry 810, which may comprise e.g., the receiving port 806 and the sending port 807. The processing circuitry 810 may be configured to, or operable to, perform the method actions according to FIG. 5, in a similar manner as that described in relation to FIG. 8a. The radio circuitry 810 may be configured to set up and maintain at least a wireless connection with the second base station 112 and/or the user equipment 130. Circuitry may be understood herein as a hardware component.

Hence, embodiments herein also relate to the first base station 111 comprising the processing circuitry 804 and the memory 805, said memory 805 containing instructions executable by said processing circuitry 804, whereby the first base station 111 is operative to perform the actions described herein in relation to the first base station 111, e.g., in FIG. 5.

Figure 9:
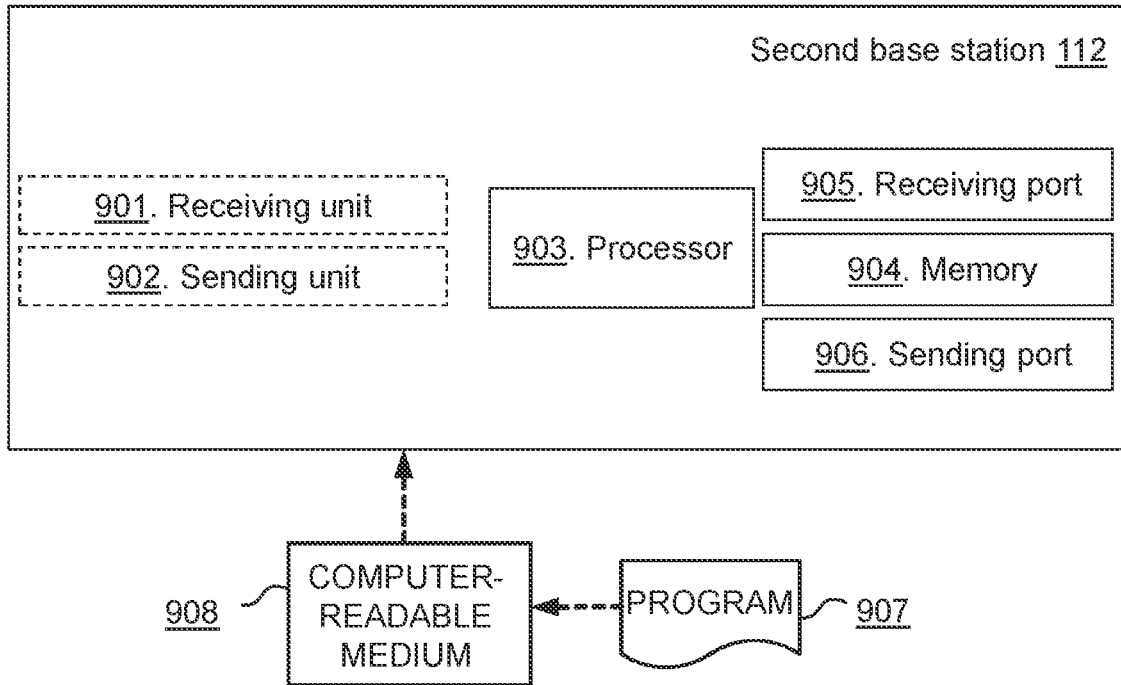
FIG. 9 is a schematic block diagram illustrating embodiments of a second base station, according to embodiments herein.
Figure 9:
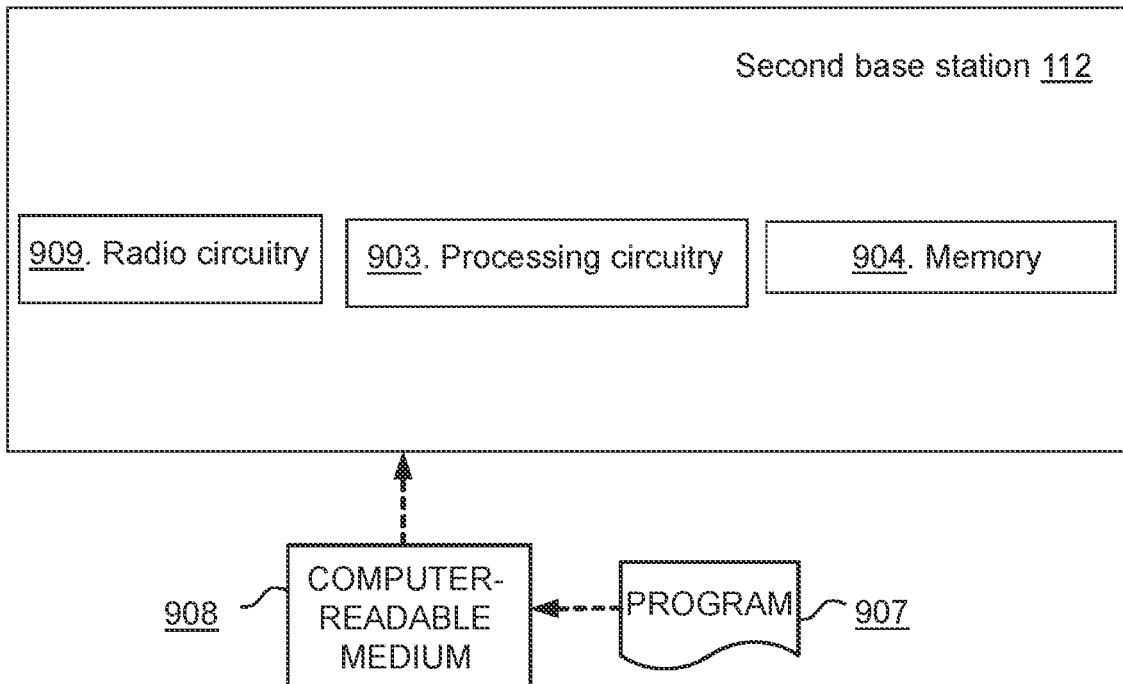

FIG. 9 depicts two different examples in panels a) and b), respectively, of the arrangement that the second base station 112 may comprise to perform the method actions described above in relation to FIG. 6. In some embodiments, the second base station 112 may comprise the following arrangement depicted in FIG. 9a. The second base station 112 may be understood to be for handling one or more measurements to be performed by the UE 130. The second base station 112 may be understood to serve the UE 130 with the first base station 111 in the wireless communication network 100 in a dual connectivity setup.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first base station 111 and will thus not be repeated here. For example, the second base station 112 may be an LTE eNB.

In FIG. 9, optional modules are indicated with dashed boxes.

The second base station 112 is configured to perform the receiving of Action 601, e.g., by means of a receiving unit 901 within the second base station 112, configured to receive the first message from the first base station 111. The first message is configured to comprise information regarding which one or more frequencies in the first set of frequencies are to be changed in one or more measurements to be performed by the UE 130. The first base station 111 and the second base station 112 are configured to serve the UE 130.

The first set of frequencies may be configured to be NR frequencies.

In some embodiments, the change in the one or more measurements may be configured to comprise adding or removing the one or more frequencies in the first set of frequencies configured to be measured.

In some embodiments, the second base station 112 may be further configured to perform the sending of Action 602, e.g., by means of a sending unit 902 within the second base station 112, configured to send, to the first base station 111, the inter-node RRC message configured to comprise the measurement gap configuration. The measurement gap configuration may be configured to be based on the first message configured to be received from the first base station 111.

The MN RRC message may be configured to be an LTE RRC message, and the SN message may be configured to be an NR RRC reconfiguration message.

In some embodiments, the first base station 111 may be configured to be an MN, and the second base station 112 may be configured to be an SN.

In other embodiments, the first base station 111 may be configured to be an SN, and the second base station 112 may be configured to be an MN.

The embodiments herein in the second base station 112 may be implemented through one or more processors, such as a processor 903 in the second base station 112 depicted in FIG. 9a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second base station 112. One such carrier may be in the form of a CD ROM disc. It is however feasible with other data carriers such as a memory stick. The computer program code may furthermore be provided as pure program code on a server and downloaded to the second base station 112.

The second base station 112 may further comprise a memory 904 comprising one or more memory units. The memory 904 is arranged to be used to store obtained information, store data, configurations, schedulings, and applications etc. to perform the methods herein when being executed in the second base station 112.

In some embodiments, the second base station 112 may receive information from, e.g., the first base station 111 and/or the user equipment 130, through a receiving port 905. In some embodiments, the receiving port 905 may be, for example, connected to one or more antennas in second base station 112. In other embodiments, the second base station 112 may receive information from another structure in the wireless communications network 100 through the receiving port 905. Since the receiving port 905 may be in communication with the processor 903, the receiving port 905 may then send the received information to the processor 903. The receiving port 905 may also be configured to receive other information.

The processor 903 in the second base station 112 may be further configured to transmit or send information to e.g., the first base station 111 and/or the user equipment 130, or another structure in the wireless communications network 100, through a sending port 906, which may be in communication with the processor 903, and the memory 904.

Those skilled in the art will also appreciate that the receiving unit 901, and the sending unit 902 described above may refer to a combination of analog and digital modules, and/or one or more processors configured with software and/or firmware, e.g., stored in memory, that, when executed by the one or more processors such as the processor 903, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 901-902 described above may be implemented as one or more applications running on one or more processors such as the processor 903.

Thus, the methods according to the embodiments described herein for the second base station 112 may be respectively implemented by means of a computer program 907 product, comprising instructions, i.e., software code portions, which, when executed on at least one processor 903, cause the at least one processor 903 to carry out the actions described herein, as performed by the second base station 112. The computer program 907 product may be stored on a computer-readable storage medium 908. The computer-readable storage medium 908, having stored thereon the computer program 907, may comprise instructions which, when executed on at least one processor 903, cause the at least one processor 903 to carry out the actions described herein, as performed by the second base station 112. In some embodiments, the computer-readable storage medium 908 may be a non-transitory computer-readable storage medium, such as a CD ROM disc, or a memory stick. In other embodiments, the computer program 907 product may be stored on a carrier containing the computer program 907 just described, wherein the carrier is one of an electronic signal, optical signal, radio signal, or the computer-readable storage medium 908, as described above.

The second base station 112 may comprise a communication interface configured to facilitate communications between the second base station 112 and other nodes or devices, e.g., the second base station 112 and/or the user equipment 130. The interface may, for example, include a transceiver configured to transmit and receive radio signals over an air interface in accordance with a suitable standard.

In other embodiments, the second base station 112 may comprise the following arrangement depicted in FIG. 9b. The second base station 112 may comprise a processing circuitry 903, e.g., one or more processors such as the processor 903, in the second base station 112 and the memory 904. The second base station 112 may also comprise a radio circuitry 909, which may comprise e.g., the receiving port 905 and the sending port 906. The processing circuitry 909 may be configured to, or operable to, perform the method actions according to FIG. 6, in a similar manner as that described in relation to FIG. 9a. The radio circuitry 909 may be configured to set up and maintain at least a wireless connection with the first base station 111 and/or the user equipment 130. Circuitry may be understood herein as a hardware component.

Hence, embodiments herein also relate to the second base station 112 comprising the processing circuitry 903 and the memory 904, said memory 904 containing instructions executable by said processing circuitry 903, whereby the second base station 112 is operative to perform the actions described herein in relation to the second base station 112, e.g., in FIG. 6.

Figure 10:
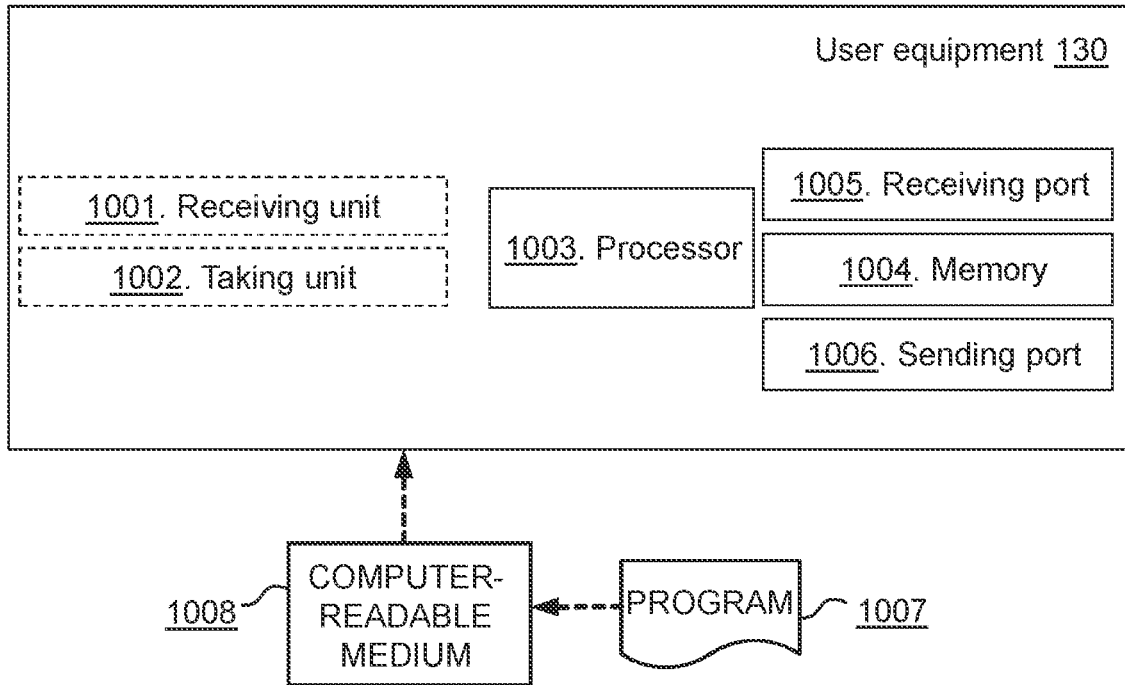
FIG. 10 is a schematic block diagram illustrating a user equipment, according to embodiments herein.
Figure 10:
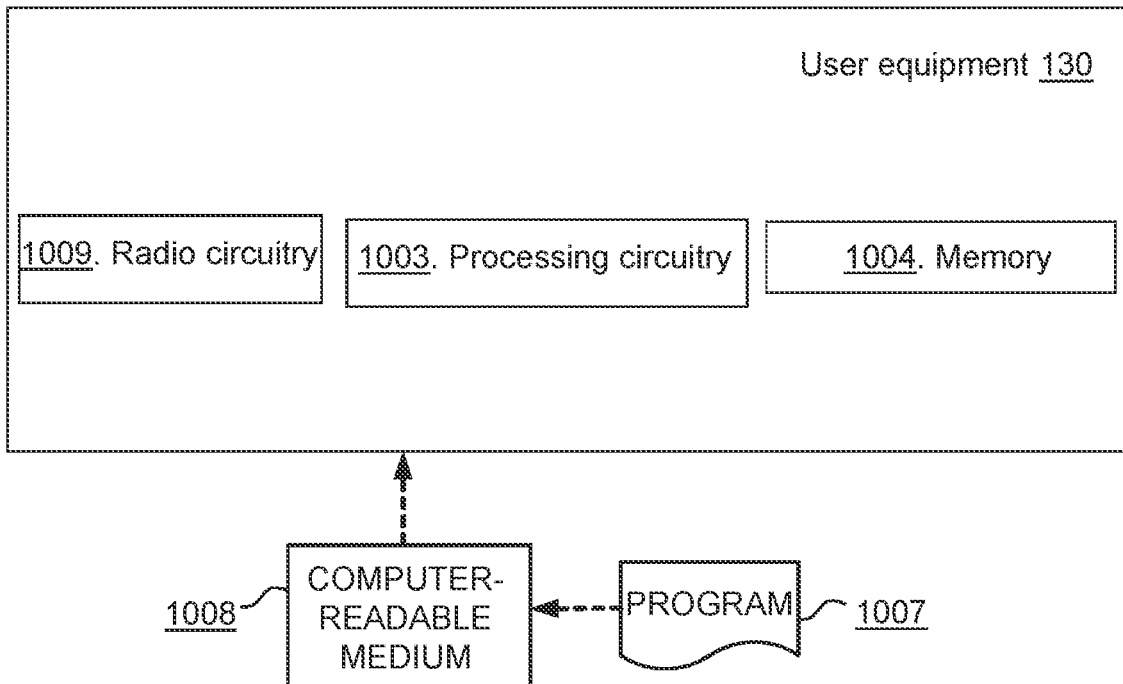

FIG. 10 depicts two different examples in panels a) and b), respectively, of the arrangement that the user equipment 130 may comprise to perform the method actions described above in relation to FIG. 7. In some embodiments, the user equipment 130 may comprise the following arrangement depicted in FIG. 10a. The user equipment 130 may be understood to be for handling one or more measurements to be performed by the UE 130. The first base station 111 may be understood to serve the UE 130 with the second base station 112 in the wireless communication network 100 in a dual connectivity setup.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the user equipment 130 and will thus not be repeated here. For example, the dual connectivity setup may be EN-DC.

In FIG. 10, optional modules are indicated with dashed boxes.

The user equipment 130 is configured to perform the receiving of action 701, e.g., by means of a receiving module 1001 within the user equipment 130, configured to receive, from the first base station 111, the configuration message configured to specify one of the following options. According to the first option, the configuration message is configured to specify one or more measurements the UE 130 is to perform with an MN RRC reconfiguration message. The MN RRC message may be configured to embed an SN RRC message. The SN RRC message configured to be embedded is configured to configure the UE 130 with the measurement gap configuration. According to the second option, the configuration message is configured to specify the measurement gap configuration the UE 130 is to apply with an MN RRC reconfiguration message. The MN RRC message is configured to embed the SN RRC message. The SN RRC message configured to be embedded is configured to specify the one or more measurements the UE 130 is to perform.

In some embodiments, the user equipment 130 is also configured to perform the taking of action 702, e.g., by means of a taking module 1002 within the user equipment 130, configured to take the one or more measurements based on the configuration message configured to be received.

The MN RRC message may be configured to be an LTE RRC message, and the SN message may be configured to be an NR RRC reconfiguration message.

In some embodiments, the UE 130 may be configured to be served by the first base station 111 as a MN, and by the second base station 112, wherein the second base station 112 may be configured to be an SN.

In other embodiments, the UE 130 may be configured to be served by the first base station 111 as a SN, and by the second base station 112 as a MN.

The embodiments herein in the user equipment 130 may be implemented through one or more processors, such as a processor 1003 in the user equipment 130 depicted in FIG. 10a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the user equipment 130. One such carrier may be in the form of a CD ROM disc. It is however feasible with other data carriers such as a memory stick. The computer program code may furthermore be provided as pure program code on a server and downloaded to the user equipment 130.

The user equipment 130 may further comprise a memory 1004 comprising one or more memory units. The memory 1004 is arranged to be used to store obtained information, store data, configurations, schedulings, and applications etc. to perform the methods herein when being executed in the user equipment 130.

In some embodiments, the user equipment 130 may receive information from, e.g., the first base station 111 and/or the second base station 112, through a receiving port 1005. In some embodiments, the receiving port 1005 may be, for example, connected to one or more antennas in user equipment 130. In other embodiments, the user equipment 130 may receive information from another structure in the wireless communications network 100 through the receiving port 1005. Since the receiving port 1005 may be in communication with the processor 1003, the receiving port 1005 may then send the received information to the processor 1003. The receiving port 1005 may also be configured to receive other information.

The processor 1003 in the user equipment 130 may be further configured to transmit or send information to e.g., the first base station 111 and/or the second base station 112 or another structure in the wireless communications network 100, through a sending port 1006, which may be in communication with the processor 1003, and the memory 1004.

Those skilled in the art will also appreciate that the receiving unit 1001 and the taking module 1002 described above may refer to a combination of analog and digital modules, and/or one or more processors configured with software and/or firmware, e.g., stored in memory, that, when executed by the one or more processors such as the processor 1003, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1001-1002 described above may be implemented as one or more applications running on one or more processors such as the processor 1003.

Thus, the methods according to the embodiments described herein for the user equipment 130 may be respectively implemented by means of a computer program 1007 product, comprising instructions, i.e., software code portions, which, when executed on at least one processor 1003, cause the at least one processor 1003 to carry out the actions described herein, as performed by the user equipment 130. The computer program 1007 product may be stored on a computer-readable storage medium 1008. The computer-readable storage medium 1008, having stored thereon the computer program 1007, may comprise instructions which, when executed on at least one processor 1003, cause the at least one processor 1003 to carry out the actions described herein, as performed by the user equipment 130. In some embodiments, the computer-readable storage medium 1008 may be a non-transitory computer-readable storage medium, such as a CD ROM disc, or a memory stick. In other embodiments, the computer program 1007 product may be stored on a carrier containing the computer program 1007 just described, wherein the carrier is one of an electronic signal, optical signal, radio signal, or the computer-readable storage medium 1008, as described above.

The user equipment 130 may comprise a communication interface configured to facilitate communications between the user equipment 130 and other nodes or devices, e.g., the second base station 102. The interface may, for example, include a transceiver configured to transmit and receive radio signals over an air interface in accordance with a suitable standard.

In other embodiments, the user equipment 130 may comprise the following arrangement depicted in FIG. 10b.

The user equipment 130 may comprise a processing circuitry 1003, e.g., one or more processors such as the processor 1003, in the user equipment 130 and the memory 1004. The user equipment 130 may also comprise a radio circuitry 1009, which may comprise e.g., the receiving port 1005 and the sending port 1006. The processing circuitry 1003 may be configured to, or operable to, perform the method actions according to FIG. 7, in a similar manner as that described in relation to FIG. 10a. The radio circuitry 1009 may be configured to set up and maintain at least a wireless connection with the first base station 111 and/or the second base station 112. Circuitry may be understood herein as a hardware component.

Hence, embodiments herein also relate to the user equipment 130 operative to handle a failure, the user equipment 130 being operative to operate in the wireless communications network 100. The user equipment 130 may comprise the processing circuitry 1003 and the memory 1004, said memory 1004 containing instructions executable by said processing circuitry 1003, whereby the user equipment 130 is further operative to perform the actions described herein in relation to the user equipment 130, e.g., in FIG. 7.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Examples related to embodiments herein

GROUP A EXAMPLES

1. A method performed by a wireless device, the method comprising:
   taking one or more measurements based on information provided as described in any of the Examples discussed above.

2. The method of 1 wherein the one or more measurements are based on information provided by a first network node and a second network node.

3. The method of any of the previous Examples, further comprising:
   providing user data; and
   forwarding the user data to a host computer via the transmission to the base station.

GROUP B EXAMPLES

4. A method performed by a base station, the method comprising:
   determining a change in the measurements to be performed by a UE, the measurements associated with a first set of frequencies; and
   transmitting a first message, the first message comprising information regarding one or more frequencies/carriers that are to be changed.

5. The method of 4, wherein the first set of frequencies are NR frequencies.

6. The method of 4-5 wherein the change in the measurements comprises adding or removing one or more frequencies or carriers to be measured.

7. The method of 4-6 wherein the first message is transmitted to a secondary node (SN), the SN configured to use the first message to determine how many measurements remain for it request the UE perform.

8. The method of 4-7 wherein the UE can perform a first number of measurements.

9. The method of 4-8 wherein upon a frequency being removed, the SN starts counting the measurements on the concerned frequencies towards the first number of measurements.

10. The method of 4-9 wherein the base station waits to receive a confirmation message from the SN that a gap is configured before transmitting a configuration message to the UE specifying the measurements the UE is to perform.

11. The method of 4-10 wherein the SN transmits an ACK via an X2 interface that could also optionally contain the measurement gap configuration in an NR RRC connection reconfiguration message.

12. The method of 4-11 further comprising transmitting to the UE a measurement config that configures in an LTE RRC message, embedding the NR RRC message that the SN has just sent.

13. The method of 4-12 further comprising receiving a message from the SN, the message from the SN comprising an indication that the SN has changed the measurements it will ask the UE to perform.

14. The method of 4-13 further comprising modifying the measurements to be performed by the UE based on the message from the SN.

15. The method of any of the previous Examples, further comprising:
   obtaining user data; and
   forwarding the user data to a host computer or a wireless device.

Further Extensions and Variations

Figure 11:
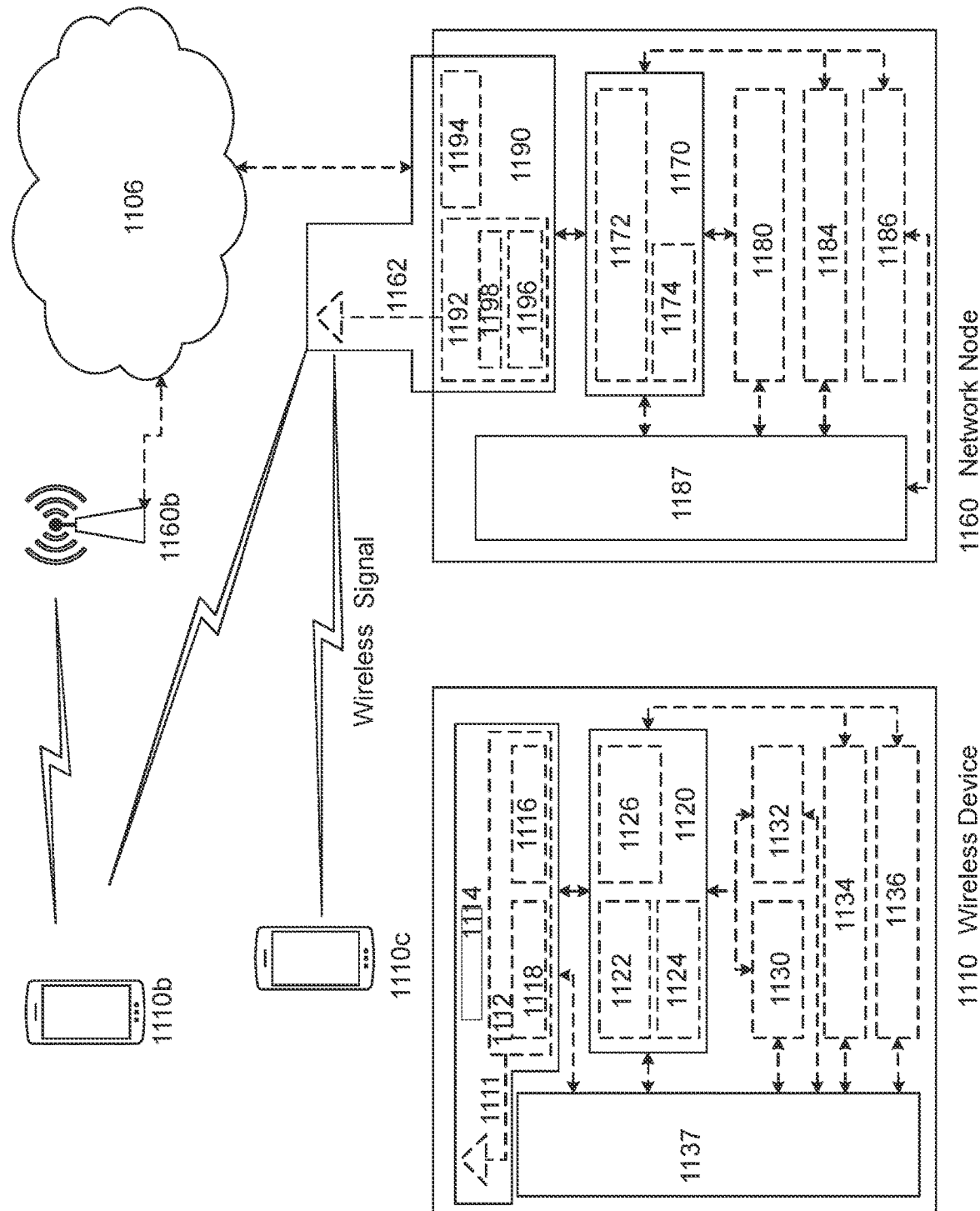
FIG. 11 is a schematic block diagram illustrating a wireless network in accordance with some embodiments herein.

FIG. 11: A Wireless Network in Accordance with Some Embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. Any of the first base station 111 and the second base station 112, may be considered examples of the network node 1160. The user equipment 130 may be considered an example of the wireless device (WD) 1110. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160 but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120 and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110 and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
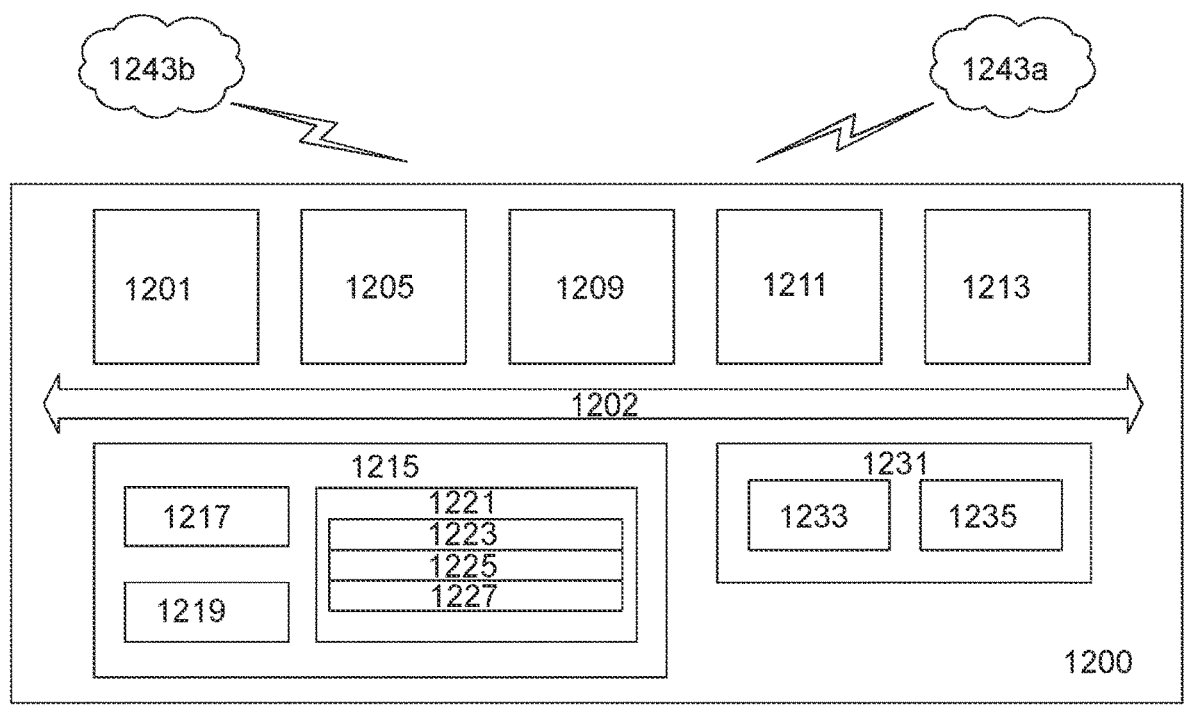
FIG. 12 is a schematic block diagram illustrating a user equipment, according to embodiments herein.

FIG. 12: User Equipment in Accordance with Some Embodiments

FIG. 12 illustrates one embodiment of a UE in accordance with various aspects described herein, such as the user equipment 130. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above.

For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243*b* may encompass wired and/or wireless networks such as a local-area network (LAN), a wide-area network (WAN), a computer network, a wireless network, a telecommunications network, another like network or any combination thereof. For example, network 1243*b* may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200.

Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
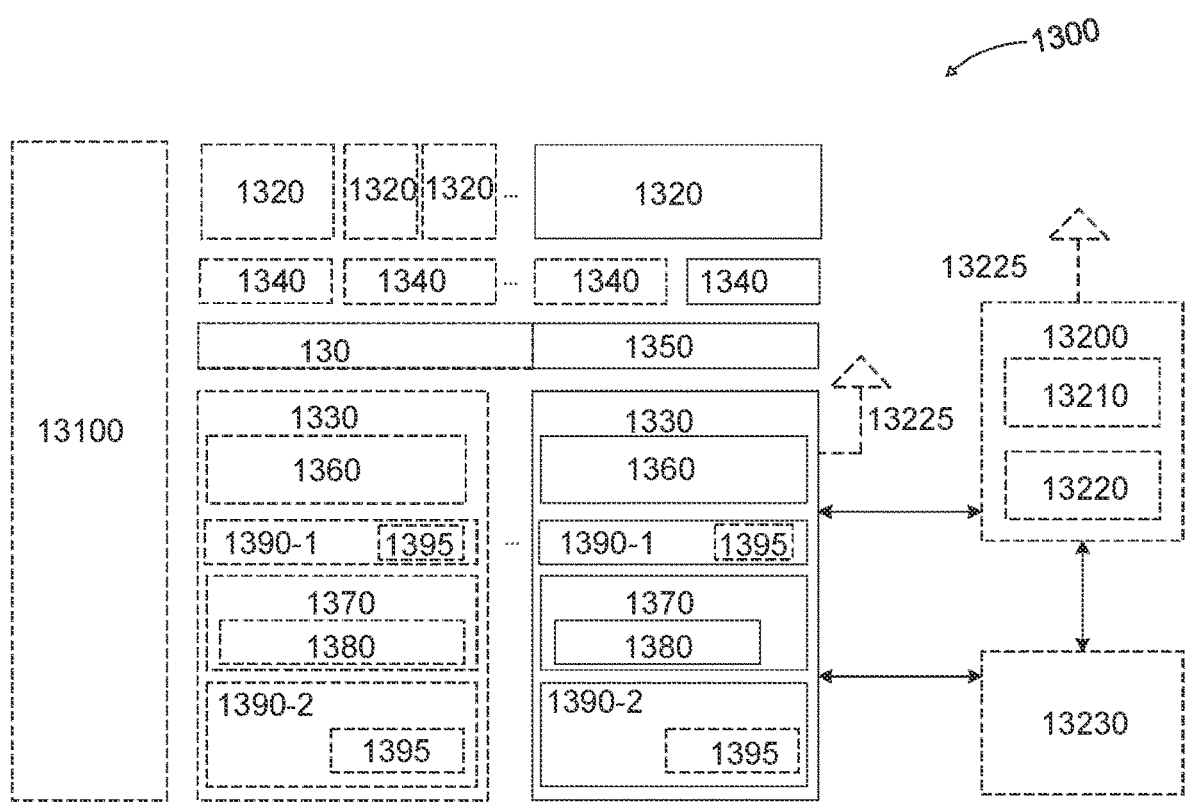
FIG. 13 is a schematic block diagram illustrating a virtualization environment, according to embodiments herein.

FIG. 13: Virtualization Environment in Accordance with Some Embodiments

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node, such as any of the first base station 111 or the second base station 112 described above) or to a device (e.g., a UE, a wireless device or any other type of communication device such as the user equipment 130) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 14:
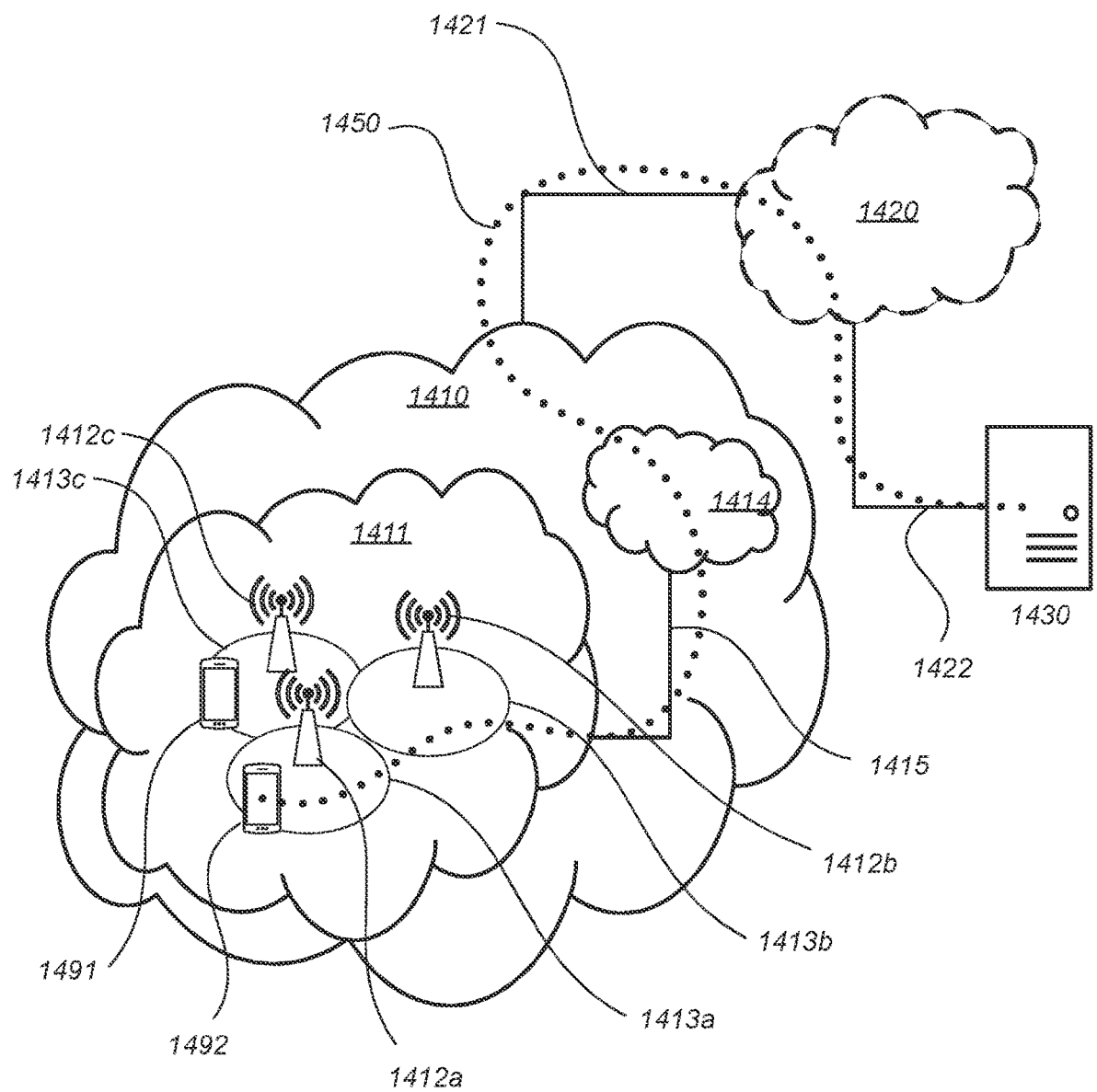
FIG. 14 is a schematic block diagram illustrating a telecommunication network connected via an intermediate network to a host computer, according to embodiments herein.

FIG. 14: Telecommunication Network Connected Via an Intermediate Network to a Host Computer in Accordance with Some Embodiments With reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Any of the base stations 1412a, 1412b, 1412c may be, for example, the first base station 111 or the second base station 112. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412. Any of the first UE 1491 and the second UE 1492 may be, for example, the user equipment 130.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

In relation to FIGS. 15, 16, 17, 18 and 19, which are described next, it may be understood that a UE is an example of the user equipment 130, and that any description provided for the UE equally applies to the user equipment 130. It may be also understood that the base station is an example of any of the first base station 111 or the second base station 112 described above.

Figure 15:
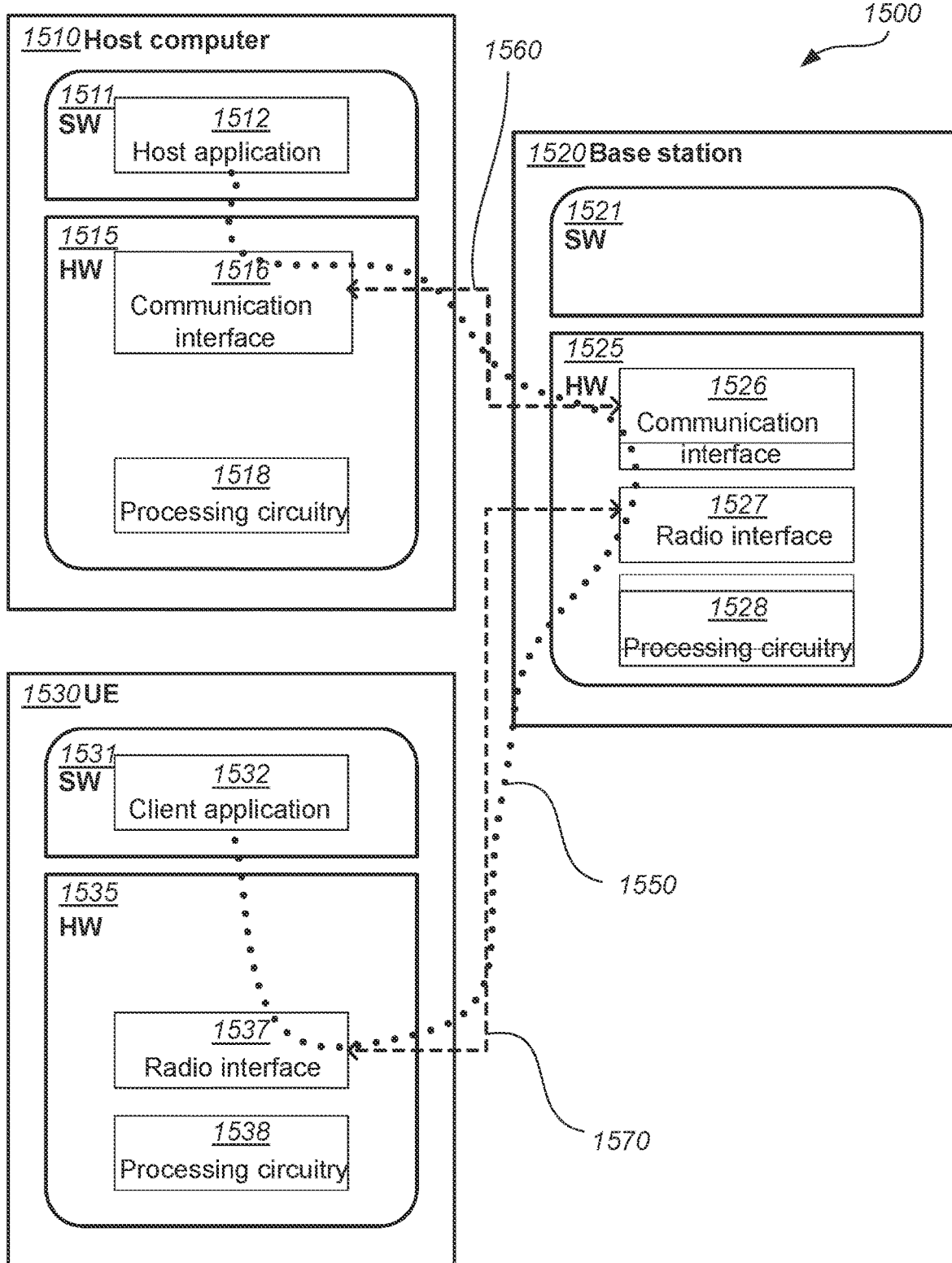
FIG. 15 is a generalized block diagram of a host computer communicating via a base station with a user equipment over a partially wireless connection, according to embodiments herein.

FIG. 15: Host Computer Communicating Via a Base Station with a User Equipment Over a Partially Wireless Connection in Accordance with Some Embodiments Example implementations, in accordance with an embodiment, of the UE, base station and host computer discussed in the preceding paragraphs will now be described with reference to FIG. 15. In communication system 1500, such as the wireless communications network 100, for example, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412a, 1412b, 1412c and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the UE's measurement capability and thereby provide benefits such as improved frequency usage which in turn may provide better bandwidth/data rates.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
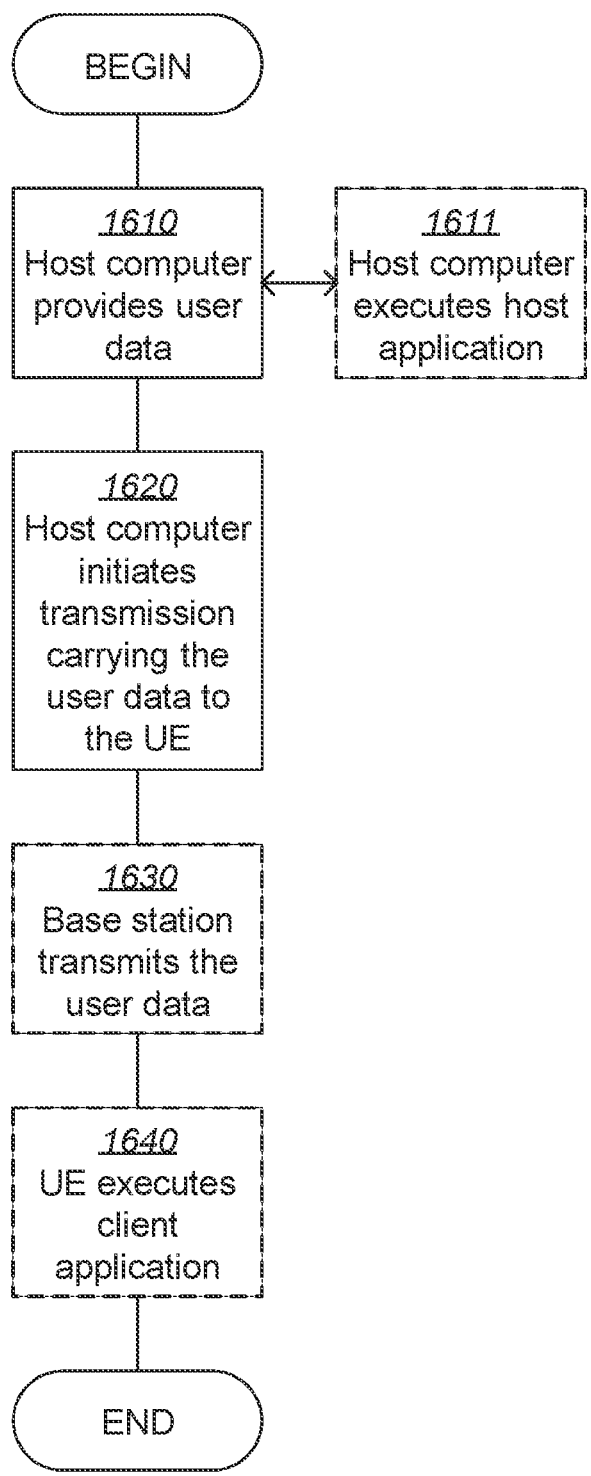
FIG. 16 is a flowchart depicting embodiments of a method in a communications system including a host computer, a base station and a user equipment, according to embodiments herein.

FIG. 16: Methods Implemented in a Communication System Including a Host Computer, a Base Station and a User Equipment in Accordance with Some Embodiments FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
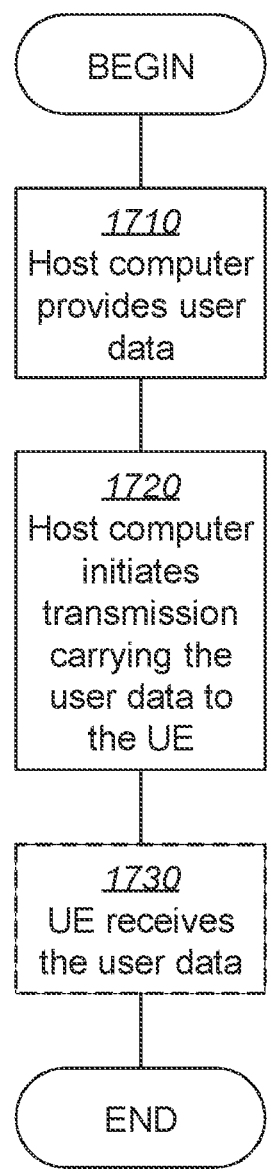
FIG. 17 is a flowchart depicting embodiments of a method in a communications system including a host computer, a base station and a user equipment, according to embodiments herein.

FIG. 17: Methods Implemented in a Communication System Including a Host Computer, a Base Station and a User Equipment in Accordance with Some Embodiments FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
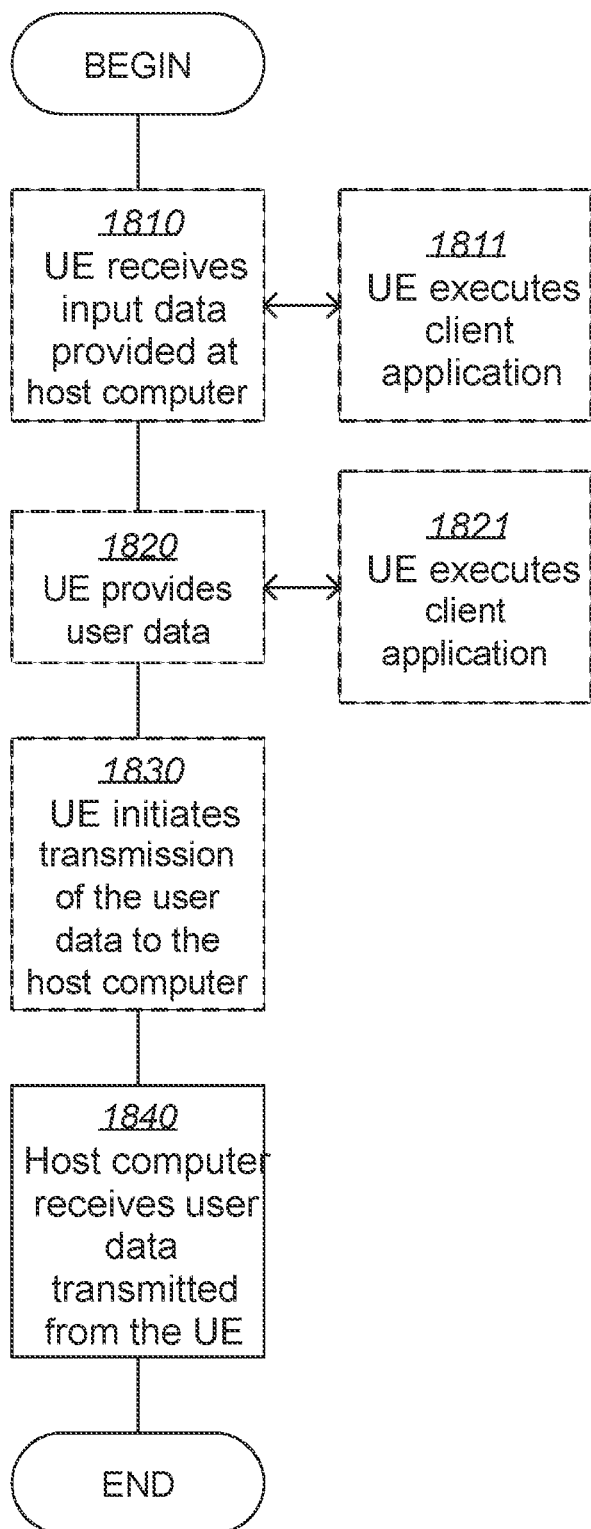
FIG. 18 is a flowchart depicting embodiments of a method in a communications system including a host computer, a base station and a user equipment, according to embodiments herein.

FIG. 18: Methods Implemented in a Communication System Including a Host Computer, a Base Station and a User Equipment in Accordance with Some Embodiments FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
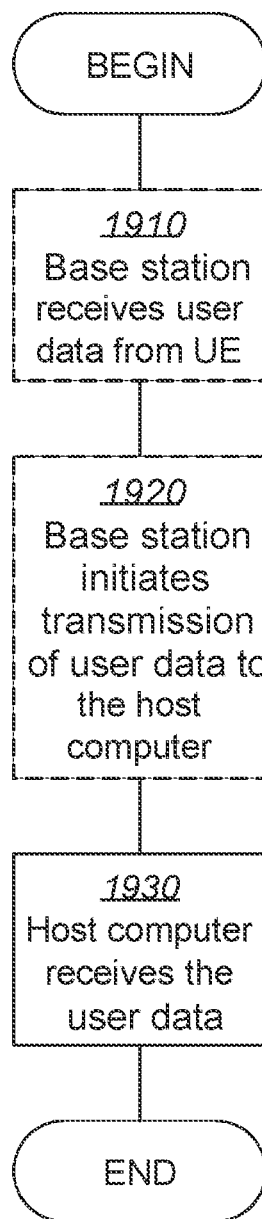
FIG. 19 is a flowchart depicting embodiments of a method in a communications system including a host computer, a base station and a user equipment, according to embodiments herein.

FIG. 19: Methods Implemented in a Communication System Including a Host Computer, a Base Station and a User Equipment in Accordance with Some Embodiments FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FURTHER NUMBERED EMBODIMENTS

1. A wireless device comprising:
   processing circuitry configured to perform any of the steps of any of the Group A examples or any of the Actions performed by the UE 130; and
   power supply circuitry configured to supply power to the wireless device.

2. A base station comprising:
   processing circuitry configured to perform any of the steps of any of the Group B examples or any of the Actions performed by the first base station 111 or the second base station 112;
   power supply circuitry configured to supply power to the wireless device.

3. A user equipment (UE) comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A examples or any of the Actions performed by the UE 130;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.

4. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B examples or any of the Actions performed by the first base station 111 or the second base station 112.

5. The communication system of the previous embodiment further including the base station.

6. The communication system of the previous 2 embodiments, further including the UE, wherein the UE is configured to communicate with the base station.

7. The communication system of the previous 3 embodiments, wherein:
   the processing circuitry of the host computer is configured to execute a host application, thereby providing the user data; and
   the UE comprises processing circuitry configured to execute a client application associated with the host application.

8. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group B examples or any of the Actions performed by the first base station 111 or the second base station 112.

9. The method of the previous embodiment, further comprising, at the base station, transmitting the user data.

10. The method of the previous 2 embodiments, wherein the user data is provided at the host computer by executing a host application, the method further comprising, at the UE, executing a client application associated with the host application.

11. A user equipment (UE) configured to communicate with a base station, the UE comprising a radio interface and processing circuitry configured to performs the of the previous 3 embodiments.

12. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps of any of the Group A examples or any of the Actions performed by the UE 130.

13. The communication system of the previous embodiment, wherein the cellular network further includes a base station configured to communicate with the UE.

14. The communication system of the previous 2 embodiments, wherein:
  the processing circuitry of the host computer is configured to execute a host application, thereby providing the user data; and
  the UE's processing circuitry is configured to execute a client application associated with the host application.

15. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the UE performs any of the steps of any of the Group A examples or any of the Actions performed by the UE 130.

16. The method of the previous embodiment, further comprising at the UE, receiving the user data from the base station.

17. A communication system including a host computer comprising:
  communication interface configured to receive user data originating from a transmission from a user equipment (UE) to a base station,
  wherein the UE comprises a radio interface and processing circuitry, the UE's processing circuitry configured to perform any of the steps of any of the Group A examples or any of the Actions performed by the UE 130.

18. The communication system of the previous embodiment, further including the UE.

19. The communication system of the previous 2 embodiments, further including the base station, wherein the base station comprises a radio interface configured to communicate with the UE and a communication interface configured to forward to the host computer the user data carried by a transmission from the UE to the base station.

20. The communication system of the previous 3 embodiments, wherein:
  the processing circuitry of the host computer is configured to execute a host application; and
  the UE's processing circuitry is configured to execute a client application associated with the host application, thereby providing the user data.

21. The communication system of the previous 4 embodiments, wherein:
  the processing circuitry of the host computer is configured to execute a host application, thereby providing request data; and
  the UE's processing circuitry is configured to execute a client application associated with the host application, thereby providing the user data in response to the request data.

22. A method implemented in a communication system including a host computer, a base station and a user equipment (UE), the method comprising:
  at the host computer, receiving user data transmitted to the base station from the UE, wherein the UE performs any of the steps of any of the Group A examples or any of the Actions performed by the UE 130.

23. The method of the previous embodiment, further comprising, at the UE, providing the user data to the base station.

24. The method of the previous 2 embodiments, further comprising:
  at the UE, executing a client application, thereby providing the user data to be transmitted; and
  at the host computer, executing a host application associated with the client application.

25. The method of the previous 3 embodiments, further comprising:
  at the UE, executing a client application; and
  at the UE, receiving input data to the client application, the input data being provided at the host computer by executing a host application associated with the client application,
  wherein the user data to be transmitted is provided by the client application in response to the input data.

26. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B examples or any of the Actions performed by the first base station 111 or the second base station 112.

27. The communication system of the previous embodiment further including the base station.

28. The communication system of the previous 2 embodiments, further including the UE, wherein the UE is configured to communicate with the base station.

29. The communication system of the previous 3 embodiments, wherein:
  the processing circuitry of the host computer is configured to execute a host application;
  the UE is configured to execute a client application associated with the host application, thereby providing the user data to be received by the host computer.

30. A method implemented in a communication system including a host computer, a base station and a user equipment (UE), the method comprising:
  at the host computer, receiving, from the base station, user data originating from a transmission which the base station has received from the UE, wherein the UE performs any of the steps of any of the Group A examples or any of the Actions performed by the UE 130.

31. The method of the previous embodiment, further comprising at the base station, receiving the user data from the UE.

32. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

REFERENCES

[1] R4-1711940, LS on gaps for SS block measurement in NR, Ericsson, RAN4 #84bis Dubrovnik, Croatia, 9-13 Oct. 2017

[2] Report of e-mail [100 #31][NR] Inter-Node RRC message, R2-xxxx

[3] 38.331

[4] 38.133

What is claimed is:

1. A method performed by a base station operating as a first base station serving a User Equipment (UE) in multi-connectivity with a second base station, the method comprising:

determining a change in a first set of frequencies associated with one or more measurements to be performed by the UE;

transmitting a first message to the second base station, the first message indicating the change;

receiving an inter-node Radio Resource Control (RRC) message from the second base station, as a second message that indicates a measurement gap configuration to be used by the UE, the measurement gap configuration determined by the second base station based on the change; and transmitting a third message to the UE, the third message being a RRC message that indicates the one or more measurements to be performed by the UE and embeds the second message indicating the measurement gap configuration to be used by the UE.

2. The method according to claim 1, wherein the first set of frequencies comprises New Radio (NR) frequencies.

3. The method according to claim 1, wherein the change comprises adding or removing one or more frequencies in the first set of frequencies.

4. A method performed by a base station operating as a second base station serving a User Equipment (UE) in multiconnectivity with a first base station, the method comprising:

receiving a first message from the first base station, the first message indicating a change in a first set of frequencies associated with one or more measurements to be performed by the UE;

determining a measurement gap configuration to be used by the UE, based on the change; and sending a second message to the first base station for subsequent transmission to the UE as an embedded message, the second message being an inter-node Radio Resource Control (RRC) message that indicates the measurement gap configuration to be used by the UE.

5. The method according to claim 4, wherein the first set of frequencies comprises New Radio (NR) frequencies.

6. The method according to claim 4, wherein the change comprises adding or removing the one or more frequencies in the first set of frequencies.

7. A method performed by a user equipment (UE) served by a first base station acting as a Master Node (MN) and by a second base station acting as a Secondary Node (SN), the method comprising:

receiving a configuration message from the first base station, the configuration message comprising a MN Radio Resource Control (RRC) message specifying one or more measurements to be performed by the UE and embedding a SN RRC message comprising a measurement gap configuration to be used by the UE, as determined by the second base station; and performing the one or more measurements based on the configuration message.

8. The method according to claim 7, wherein the MN RRC message is a Long Term Evolution (LTE) RRC message, and wherein the SN RRC message is a New Radio (NR) RRC reconfiguration message.

9. The method according to claim 7, wherein the measurement gap configuration is determined by the second base station based on a change indicated by the first base station, regarding a first set of frequencies associated with the one or more measurements to be performed by the UE.

10. A base station comprising:

radio circuitry configured for communicating with User Equipments (UE); and processing circuitry that, with respect to the base station acting as a first base station serving a UE in multiconnectivity with a second base station, is configured to:

determine a change in a first set of frequencies associated with one or more measurements to be performed by the UE;

transmit a first message to the second base station, the first message comprising information regarding the change;

receive a second message from the second base station, the second message being an inter-node Radio Resource Control (RRC) message indicating a measurement gap configuration to be used by the UE, the measurement gap configuration determined by the second base station based on the change; and transmit a third message to the UE, the third message being a RRC message indicating the one or more measurements to be performed by the UE and embedding the second message indicating the measurement gap configuration to be used by the UE.

11. A base station comprising:

radio circuitry configured for communicating with User Equipments (UE); and processing circuitry that, with respect to the base station acting as a second base station serving a UE in multi-connectivity with a first base station, is configured to:

receive a first message from the first base station, the first message comprising information regarding a change in a first set of frequencies associated with one or more measurements to be performed by a user equipment (UE);

determine a measurement gap configuration to be used by the UE, based on the change; and send an inter-node Radio Resource Control (RRC) message to the first base station as a second message for subsequent transmission to the UE as an embedded message, the second message comprising the measurement gap configuration to be used by the UE.

12. A user equipment (UE) comprising:

radio circuitry configured for communicating with base stations; and processing circuitry that, with respect to the UE being served by a first base station acting as a Master Node (MN) and by a second base station acting as a Secondary Node (SN), is configured to:

receive, via the radio circuitry, a configuration message from the first base station, the configuration message comprising a MN Radio Resource Control (RRC) configuration message specifying one or more measurements to be performed by the UE and embedding a SN RRC message comprising a measurement gap configuration to be used by the UE, as determined by the second base station; and control the UE to perform the one or more measurements based on the configuration message.

13. A method performed by a user equipment (UE) served by a first base station acting as a Master Node (MN) and by a second base station acting as a Secondary Node (SN), the method comprising:
  receiving measurement configuration information generated by the first base station, identifying a measurement object involving a carrier frequency associated with the second base station;
  receiving measurement gap configuration information generated by the second base station, configuring measurement gaps to be used by the UE for measuring on the carrier frequency; and
  performing measurements on the carrier frequency according to the configured measurement gaps.

* * * * *